(12) United States Patent
Matthews

(10) Patent No.: US 10,989,839 B1
(45) Date of Patent: Apr. 27, 2021

(54) GROUND-BASED SKY IMAGING AND IRRADIANCE PREDICTION SYSTEM

(71) Applicant: University of Hawai'i, Honolulu, HI (US)

(72) Inventor: Dax Kristopher Matthews, Honolulu, HI (US)

(73) Assignee: University of Hawai'i, Honolulu, HI (US)

( * ) Notice: Subject to any disclaimer, the term of this patent is extended or adjusted under 35 U.S.C. 154(b) by 323 days.

(21) Appl. No.: 16/116,904

(22) Filed: Aug. 29, 2018

Related U.S. Application Data

(60) Provisional application No. 62/551,634, filed on Aug. 29, 2017.

(51) Int. Cl.
*G01W 1/12* (2006.01)
*G01W 1/18* (2006.01)
(Continued)

(52) U.S. Cl.
CPC .......... *G01W 1/12* (2013.01); *G01W 1/10* (2013.01); *G01W 1/18* (2013.01); *G06T 7/248* (2017.01); *G06T 7/73* (2017.01); *H04N 5/23238* (2013.01); *G06K 9/6201* (2013.01); *G06K 9/6267* (2013.01); *G06T 7/215* (2017.01);
(Continued)

(58) Field of Classification Search
CPC ........... G01W 1/12; G01W 1/10; G01W 1/18; G06T 7/73; G06T 7/248; G06T 7/215; G06T 2207/10012; G06T 2207/10016; G06T 2207/10048; G06T 2207/30192;
(Continued)

(56) References Cited

U.S. PATENT DOCUMENTS 9,201,424 B1 * 12/2015 Ogale ................. G05D 1/0253
9,565,377 B2 * 2/2017 Hamann ................ G01W 1/12
(Continued)

OTHER PUBLICATIONS

Netanyahu et al., Georegistration of Landsat Data via Robust Matching of Multiresolution Features, IEEE Transactions on Geoscience and Remote Sensing, vol. 42, No. 7, pp. 1586-1600 (Year: 2004).*

*Primary Examiner* — Toan M Le
*Assistant Examiner* — Xiuqin Sun
(74) *Attorney, Agent, or Firm* — Behmke Innovation Group LLC; James M. Behmke; James J. Wong

(57) ABSTRACT

In one embodiment, a ground-based sky imaging and irradiance measurement and prediction computing device: obtains, from an omnidirectional ultra-panoramic camera located at a ground-based mounting location, an image having a view of an entire sky located above the camera and a horizon-to-horizon view of ground and ground-based objects surrounding the camera; calibrates a relationship between locations of pixels of the image and real-world three-dimensional coordinates based on intrinsic/extrinsic properties of the camera; identifies image pixels that contain clouds; georegisters, the clouds to real-world three-dimensional coordinates; and estimates, cloud attenuation levels. A solar irradiance map can then be generated based on the georegistration of the clouds, sun position, and estimated attenuation level of the clouds, where the solar irradiance map indicates an estimation of solar irradiance to reach an area of ground surrounding the camera.

29 Claims, 16 Drawing Sheets

(51) Int. Cl.
*H04N 5/232* (2006.01)
*G06T 7/73* (2017.01)
*G06T 7/246* (2017.01)
*G01W 1/10* (2006.01)
H04N 5/247 (2006.01)
H02S 99/00 (2014.01)
G06T 7/215 (2017.01)
G06K 9/62 (2006.01)

(52) U.S. Cl.
CPC .............. *G06T 2207/10012* (2013.01); *G06T 2207/10016* (2013.01); *G06T 2207/10048* (2013.01); *G06T 2207/30192* (2013.01); *H02S 99/00* (2013.01); *H04N 5/247* (2013.01)

(58) Field of Classification Search
CPC .. H04N 5/23238; H04N 5/247; G06K 9/6201; G06K 9/6267; H02S 99/00
USPC .......................................................... 702/3
See application file for complete search history.

(56) References Cited

U.S. PATENT DOCUMENTS

2017/0031056 A1\* 2/2017 Vega-Avila .............. G06N 3/08
2018/0019594 A1\* 1/2018 Min ........................ H02J 3/383
2018/0176531 A1\* 6/2018 Liu ......................... G06T 5/005

\* cited by examiner

GROUND-BASED SKY IMAGING AND IRRADIANCE PREDICTION SYSTEM

RELATED APPLICATIONS

This application claims priority to U.S. Provisional Application No. 62/551,634, filed on Aug. 29, 2017, entitled "Affordable High-Resolution Irradiance Prediction System", by D. K. Matthews, the contents of which are hereby incorporated by reference.

GOVERNMENT SUPPORT

This invention was made with government support under N00014-12-1-0496, N00014-13-1-0463 and N00014-14-1-0054 awarded by the Office of Naval Research. The government has certain rights in the invention.

TECHNICAL FIELD

The present disclosure relates generally to solar irradiance monitoring and forecasting, and, more particularly, to a ground-based sky imaging and irradiance prediction system.

BACKGROUND

Photovoltaic (PV) power output is directly related to the amount of sunlight, or irradiance, striking the panel. Irradiance itself is primarily a function of the position of the sun and atmospheric attenuation due to transparency of the atmosphere (that is, absorption and scattering of light by water or ice particles in clouds). Short-term PV power fluctuations (ramps) can significantly influence the stability of electric grids and limit the deployment of solar power systems. For example, problematic high voltages on the circuits due to excess energy can be generated around midday hours, with over 1 megawatt (MW) fluctuations being possible due simply to the presence of large clouds in the sky. Instability of this magnitude can be particularly difficult for smaller grid infrastructures, such as those of small communities (e.g., the Hawaiian island grids, Alaskan towns, and so on).

Currently, total sky imager (TSI) systems are the best option to predict short-term fluctuations for ramp prediction, as will be understood by those skilled in the art. However, TSIs are not a cost effective option for widespread, operational solar forecasting, as a single TSI system can be an expensive and complicated weather instrument, and requires additional and expensive instrumentation for cloud geolocation (e.g., a ceilometer). Various low-cost sky imager options have also been proposed in recent years, but they lack accuracy and robustness. In particular, such systems are generally focused on determining irradiance levels at the device itself, and cannot be extended for use with distributed PV systems due to their simplicity (e.g., lacking any sort of geolocation).

SUMMARY

The techniques herein relate generally to an affordable, high-resolution ground-based sky imaging and irradiance measurement and prediction system. In particular, the techniques herein provide irradiance information to address the short-term variable nature of power generated by photovoltaic (PV) systems, such as due to variations in cloud attenuation (e.g., the position of the sun relative to PV panels and the transparency of the atmosphere between the sun and the PV panel). Said differently, an irradiance monitoring and solar power forecasting system is described herein that helps address the uncertainty related to PV solar power generation, providing real-time PV production estimates and near-term forecast for geographically dispersed PV systems by monitoring and predicting cloud location and movement.

Specifically, according to one or more embodiments of the disclosure, a computing device obtains, from an omnidirectional ultra-panoramic camera located at a ground-based mounting location, an image having a view of an entire sky located above the camera and a horizon-to-horizon view of ground and ground-based objects surrounding the camera. The computing device also calibrates a relationship between locations of pixels of the image and real-world three-dimensional coordinates based on known intrinsic properties of the camera and determined extrinsic position and orientation properties of the camera according to matching the horizon-to-horizon view of ground and ground-based objects surrounding the camera to known ground-based control points and a digital elevation model associated with the ground-based mounting location. By then identifying pixels within the image that contain clouds, the computing device may georegister the clouds to real-world three-dimensional coordinates according to the calibrating, and can also estimate an attenuation level of the clouds. As such, the computing device may then generate a solar irradiance map based on the georegistration of the clouds, a position of the sun, and estimated attenuation level of the clouds, where the solar irradiance map indicates an estimation of solar irradiance to reach an area of ground surrounding the camera.

According to one or more additional embodiments of the disclosure, based on the solar irradiance map, the techniques herein may also generate a photovoltaic (PV) power generation prediction for one or more PV panels located within the solar irradiance map.

According to still further embodiments of the disclosure, the system herein can determine motion of the clouds, predict a future georegistration of the clouds for a given time in the future based on the motion of the clouds, and then generate a forecast solar irradiance map based on the predicted future georegistration of the clouds, a future position of the sun, and the estimated attenuation level of the clouds, the forecast solar irradiance map indicating a forecast estimation of solar irradiance to reach an area of ground surrounding the camera at the given time in the future. Additionally, in one further embodiment, a PV power generation prediction at the given time in the future for one or more PV panels located within the solar irradiance map may also be generated based on the forecast solar irradiance map.

Additional and/or alternative embodiments may be described in greater detail below, and this Summary is merely illustrative, and is not meant to be limiting to the scope of the present disclosure.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Figure 1:
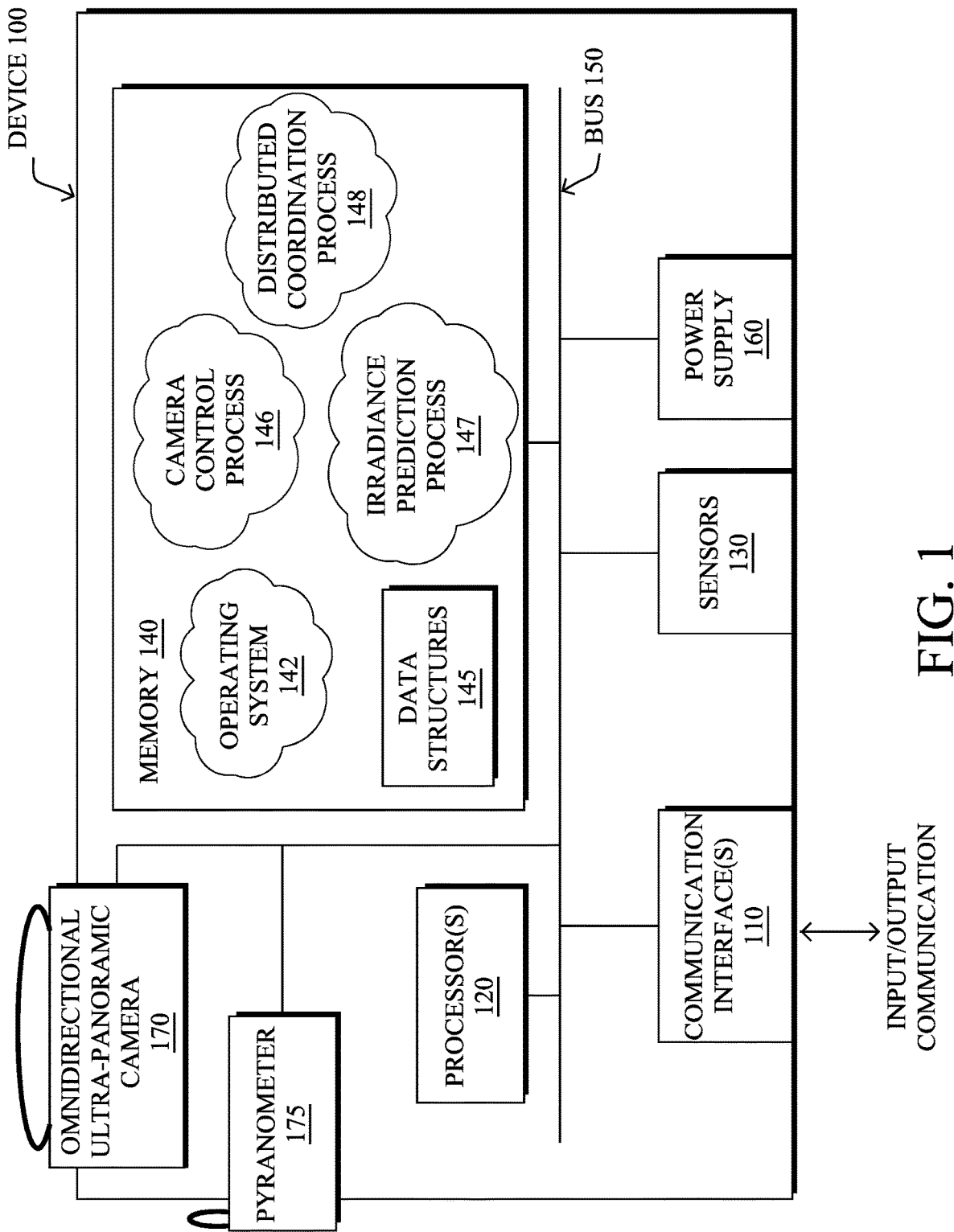
FIG. 1 illustrates an example simplified computing device for use with a ground-based sky imaging and irradiance prediction system.

Solar photovoltaic (PV) power coupled with storage and complementary energy resources is an increasingly attractive option for providing reliable and resilient energy to communities and critical infrastructure, especially in places where reliability is uncertain or the cost of electricity is high. However, integrating a large percentage of solar PV power into an electrical grid also poses technical challenges due to the variable nature of the solar resource, and is particularly relevant to small-scale microgrids. In particular, as noted above, PV power output is directly related to the amount of sunlight striking a PV panel, and this "irradiance" is directly affected by atmospheric attenuation (e.g., clouds) such that short-term PV power fluctuations (ramps) can occur based on the presence of clouds in the sky partially or completely blocking the sun.

That is, because atmospheric variability drives stochastic, short-term variability in irradiance—combined with the distributed and "behind the meter" nature of solar power generation—an inherent uncertainty accompanies PV power. This uncertainty is particularly problematic for small, isolated power grids, especially those with nowhere to release ("dump") extra solar power and those with no access to backup electricity generation from outside of the power grid (e.g., other connected grid power sources). Additionally, for grid circuits with a significant number of PV generators, the potential for more generation than load exists, causing back flow into substations, which are not designed to operate in that manner. In response, some utilities have placed limits on PV penetration and set spinning reserves using estimates of load plus possible solar power variations, which increases the cost per unit of energy.

Solar forecasting systems are thus becoming essential for grids with high penetrations of solar power to better manage scheduling, dispatch, and power regulation due to such instabilities. Current state-of-the-art hour-ahead (HA) and day-ahead (DA) forecasting is based on physical models, which rely on numerical weather prediction (NWP) and cloud observations by satellites or ground-based imagers. Such solar forecasting systems can provide information to address and reduce the uncertainty of the solar power sources for better overall grid management.

As also noted above, until now the best options to predict short-term fluctuations for ramp prediction are expensive total sky imager (TSI) systems. Due to their cost, and the fact that they cannot geographically locate clouds without additional expensive equipment, TSIs are not well-suited for widespread, operational solar forecasting. Having a plurality of distributed TSIs and geolocation devices (e.g., ceilometers) for greater area coverage and forecasting capabilities would only be available at a prohibitively high cost. Recent attempts at low-cost sky imager devices have been typically focused on merely taking images of the sky with less expensive cameras, and estimating an irradiance level at the device based on cloud cover at the device itself. However, as pointed out previously, such systems are modeled after traditional TSI systems and thus also lack any form of geolocation or robust prediction capabilities, rendering them still an incomplete answer for use with distributed PV systems due to their simplicity.

The techniques herein, on the other hand, relate generally to an affordable, high-resolution (high temporal and spatial resolution) ground-based sky imaging and irradiance measurement and prediction system, particularly one that includes robust geolocation capabilities for irradiance nowcasts and forecasts for proactive management of solar energy generation in order to mitigate the effects of PV ramps across a widespread geographic area. For example, as described below, atmospheric attenuation may be derived from sky images provided by a weatherproof, omnidirectional ultra-panoramic camera, and irradiance data can be obtained from a thermopile-based pyranometer. The low production cost and wireless capability facilitates widespread, overlapping deployment of devices, where the devices are designed to work together, providing upwind data to see past the horizon, utilizing stereo-photogrammetric techniques for cloud geolocation (notably removing the need for additional ceilometer instrumentation and allowing for three-dimensional (3D) cloud maps), and operating in an edge computing framework manner, thus reducing data transfer to a central server.

Specifically, according to one or more embodiments as described in greater detail below, an omnidirectional ultra-panoramic camera, located at a ground-based mounting location, provides images having a view of an entire sky located above the camera and a horizon-to-horizon view of ground and ground-based objects surrounding the camera. A computing device then calibrates a relationship between locations of pixels of the image and real-world three-dimensional coordinates based on known intrinsic properties of the camera and determined extrinsic position and orientation properties of the camera according to matching the horizon-to-horizon view of ground and ground-based objects surrounding the camera to known ground-based control points and a digital elevation model associated with the ground-based mounting location. By then identifying pixels within the image that contain clouds, the computing device may georegister the clouds to real-world three-dimensional coordinates according to the calibrating. The computing device can also estimate an attenuation level of the clouds based on various techniques described below. As such, a solar irradiance map may then be generated based on the georegistration of the clouds, a position of the sun, and estimated attenuation level of the clouds, where the solar irradiance map indicates an estimation of solar irradiance to reach an area of ground surrounding the camera. In further embodiments herein, based on this solar irradiance map, PV power generation predictions may also be generated for one or more PV panels located within the solar irradiance map. Moreover, in still further embodiments described herein, forecast solar irradiance maps (and forecast PV power generation predictions) can be generated based on a predicted future georegistration of the clouds according to an extrapolation of determined motion of the clouds (e.g., local or distributed computation of motion and geolocation).

—System Configuration—

Operationally, the techniques herein may be performed by a combination of hardware, software, and/or firmware. In particular, a computing device may be configured to execute one or more processes that may include computer executable instructions executed by a processor to perform functions relating to the techniques described herein, in conjunction with specifically configured hardware components of the computing device.

FIG. 1 is a simplified schematic block diagram of an example device 100 that may be used with one or more embodiments described herein, e.g., as a computing device specifically configured to provide ground-based sky imaging and irradiance prediction, or any other device that supports the operations of the techniques herein (e.g., centralized servers, distributed system controllers, etc.). The simplified device 100 may comprise one or more communication interfaces 110, one or more processors 120, one or more sensors 130, and a memory 140 interconnected by a system bus 150, and is powered by one or more power supplies 160 (e.g., wired grid connections, batteries, solar panels, primary/backup systems, switching/converting circuitry, etc.). As described herein, an omnidirectional ultra-panoramic camera 170 may also be associated with the device, as well as an optional pyranometer 175, as also described below. Additionally, various measures for environmental protection of the device 100 may be included in the design of the device, such as, for example, a weatherproof case and camera housing, mounting brackets, weatherproof cable connectors, fans and/or heat sinks to remove heat from the camera and computer, and so on, and the view shown herein is a simplified example of functionally representative components of the device 100.

Note also that while the configuration of the device 100 is schematically shown as a bus-based communication arrangement, various computing boards, direct connections, serial/sequential connections, and so on may alternatively be configured depending upon the desired hardware design implementation. For instance, a main computer board may be connected to the camera via USB and to the temperature sensors and pyranometer board via I²C (Inter-Integrated Circuit) interface and general-purpose input/output (GPIO) pins, rather than a bus 150. The view herein, therefore, is meant solely as an example implementation, and is not meant to limit the scope of the embodiments herein.

Illustratively, the communication interface(s) 110 include the mechanical, electrical, and signaling circuitry for communicating data over ports (wired or wireless), such as cellular (e.g., 4G LTE Wireless), Ethernet, USB, WiFi, and so on. The communication interfaces may be configured to transmit and/or receive data using a variety of different communication protocols, and may communicate with other devices, servers, etc., for collaboration, reporting, data collection, and so forth. For instance, an enterprise LTE 4G gateway may be used for external communications to a central server, and neighboring devices can also communicate directly using RF modules and fast peer-to-peer networking protocols to exchange data synchronization and system status information and image data required for stereo geolocation (described below). This allows the instruments to work in an edge-computing framework, able to adapt to communication problems and/or possible failures of nodes in the ensemble and reduce data transfer to the central server.

The memory 140 comprises a plurality of storage locations that are addressable by the processor(s) 120 for storing software programs and data structures associated with the embodiments described herein. The processor 120 may comprise necessary elements or logic adapted to execute the software programs and manipulate the data structures 145. An operating system 142, portions of which are typically resident in memory 140 and executed by the processor(s), functionally organizes the device by, among other things, invoking operations in support of software processors and/or services executing on the device. These software processors and/or services may comprise a camera control process 146 (e.g., to obtain images from image sensors of the camera, to control other features of the camera, etc.), an irradiance prediction process 147 (e.g., to predict the irradiance and PV power levels as described below), a distributed coordination process 148 (e.g., to communicate and coordinate with other devices), and so on, as described generally below.

Note that in one embodiment, memory 140 and processor 120 may be configured as a microcontroller which is configured to control the state of the device 100 and instrument components (e.g., a single-board computer to gather, log, and process data, and manage all instrument controls). For example, the microcontroller may control power flow within the device (e.g., using solid state relays and high power relay shields allowing for all components to be power cycled or shutdown via software or remote command).

Omnidirectional ultra-panoramic camera 170 is configured for providing a 360° panoramic and >180° (e.g., approx. 210-230°) horizon-to-horizon field of view (FOV). An example of a consumer camera meeting these criteria is the PIXPRO SP360 by KODAK, which has a 10-Megapixel image sensor, focal length of 0.805 mm, aperture of F2.8, and FOV spanning 214°. Other suitable cameras may be used, and the PIXPRO SP360 by KODAK is merely one example camera that can be used (e.g., and modified as necessary). Notably, the camera 170 and associated circuitry may be configured to take streaming/video images, or else may be configured for periodic image capture (e.g., once every twenty seconds), or on demand from specific user commands or other controlling software systems.

Cloud attenuation and local irradiance information may be provided by a pyranometer 175. The pyranometer 175 is generally local to the camera 170 (meaning within the general physical proximity of the device 100 and associated camera 170), where the pyranometer is configured to measure solar irradiance data (e.g., illustratively outputting a low voltage, which may be amplified by a high-accuracy instrumentation amplifier designed for low-level signal amplification, and converted to a digital signal using a low-noise, low-power, 8-channel, analog-to-digital converter). One example pyranometer is the Apogee SP-510 blackbody thermopile pyranometer with acrylic diffuser, which can be cosine-corrected (e.g., directional errors less than 20 W/m2 at 80° solar zenith angle) and has long-term stability (e.g., less than 2% variation per year). The pyranometer 175 and associated circuitry may also be configured to provide streaming irradiance data (a sensor-based voltage level), or else may be configured for periodic data (e.g., once every five seconds), or on demand.

Figure 2:
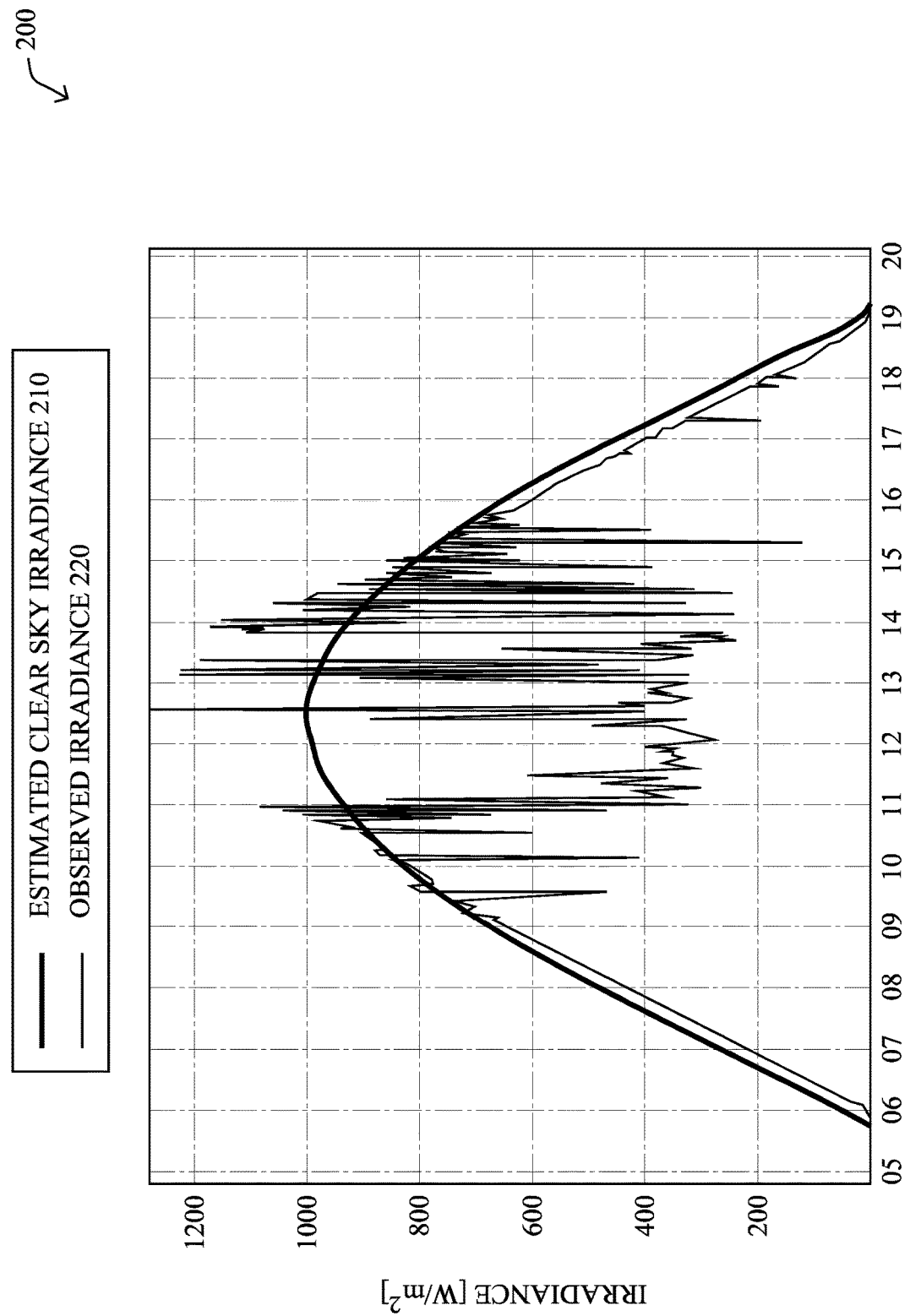
FIG. 2 illustrates an example of estimated versus observed irradiance.

FIG. 2, in particular, illustrates an example graph 200 showing an estimated clear sky irradiance 210 (e.g., in watts per square meter, W/m^2) throughout a day (e.g., hours 6 AM through 7 PM). Observed irradiance 220, on the other, indicates periods of the day where the actual irradiance at the pyranometer 175 did not match the clear sky estimate 210, with lower irradiance likely due to the presence of passing clouds during those times. (Notably, higher irradiance may be due to the estimate 210 being an average value or generally parabolic expectation, where different atmospheric and/or solar factors may create greater irradiance than estimated.)

Additional sensors 130 on the device 100 may be used to detect other environmental features, such as ambient, instrument, camera, and computer temperatures, humidity sensors, rain or wind sensors (for full weather reporting), and so on.

It will be apparent to those skilled in the art that other processor and memory types, including various computer-readable media, may be used to store and execute program instructions pertaining to the techniques described herein (e.g., microprocessors, EEPROMs, etc.). Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes. Moreover, while the components and/or processes of FIG. 1 are shown contained within a single device 100, those skilled in the art will appreciate that certain components and/or processes may be contained within separate enclosures, whether the enclosures are co-located or remotely located, such as, for example, a camera module configured to take (and possibly pre-process) images and a separated processing module configured to generate irradiance maps and/or PV power predictions based on the remotely captured images. As such, the illustration in FIG. 1 and the associated description herein is not meant to be limiting to the scope of the embodiments herein.

According to one or more embodiments described herein, a plurality of devices 100 can coordinate with each other to facilitate widespread, overlapping deployment (thanks in particular to the possibility of a low-cost design for device 100). That is, even though embodiments herein allow each device to locally compute and forecast cloud cover, irradiance, and PV power generation, there are situations below where a coordinated effort would be beneficial to the techniques herein.

Figure 3A:
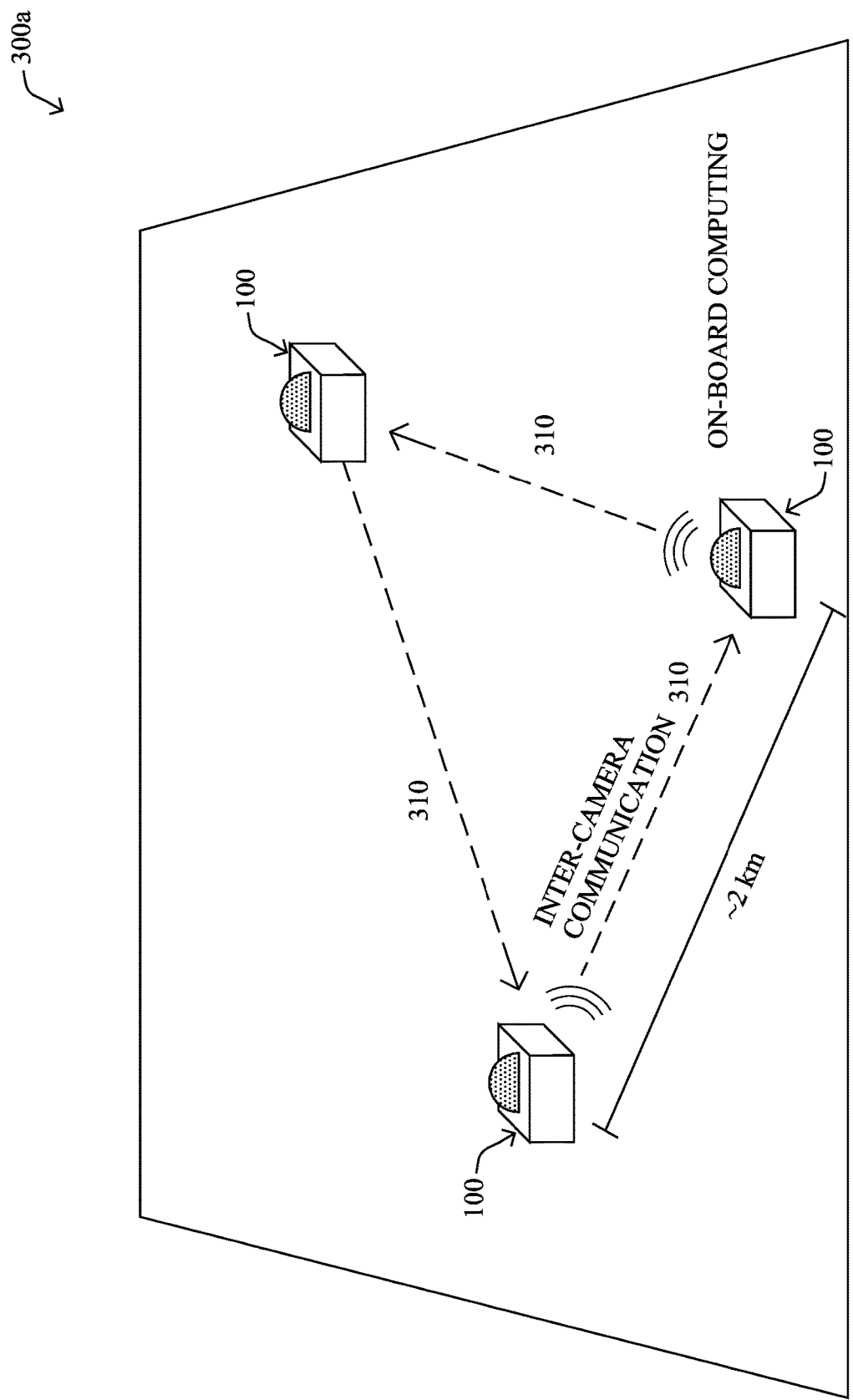
FIGS. 3A-3B illustrate example distributed deployments of computing devices for use with a ground-based sky imaging and irradiance prediction system.

Illustratively, FIG. 3A shows a simplified schematic diagram of a network 300a comprising a plurality of devices 100 with inter-device (or "inter-camera") communication 310. Communication 310 may be bidirectional between all the devices, or else may be hub-and-spoke where the devices 100 each communicate with a central device 100 or other centralized server. Illustratively, the communication links may be cellular or land-line based telephone communication (e.g., modems), internet based (e.g., WiFi, 4G LTE, etc.), direct radio frequency (RF) communication (transmitter/receiver pairs on an approved radio frequency/channel), or in certain implementations may even be wired communications.

Figure 3B:
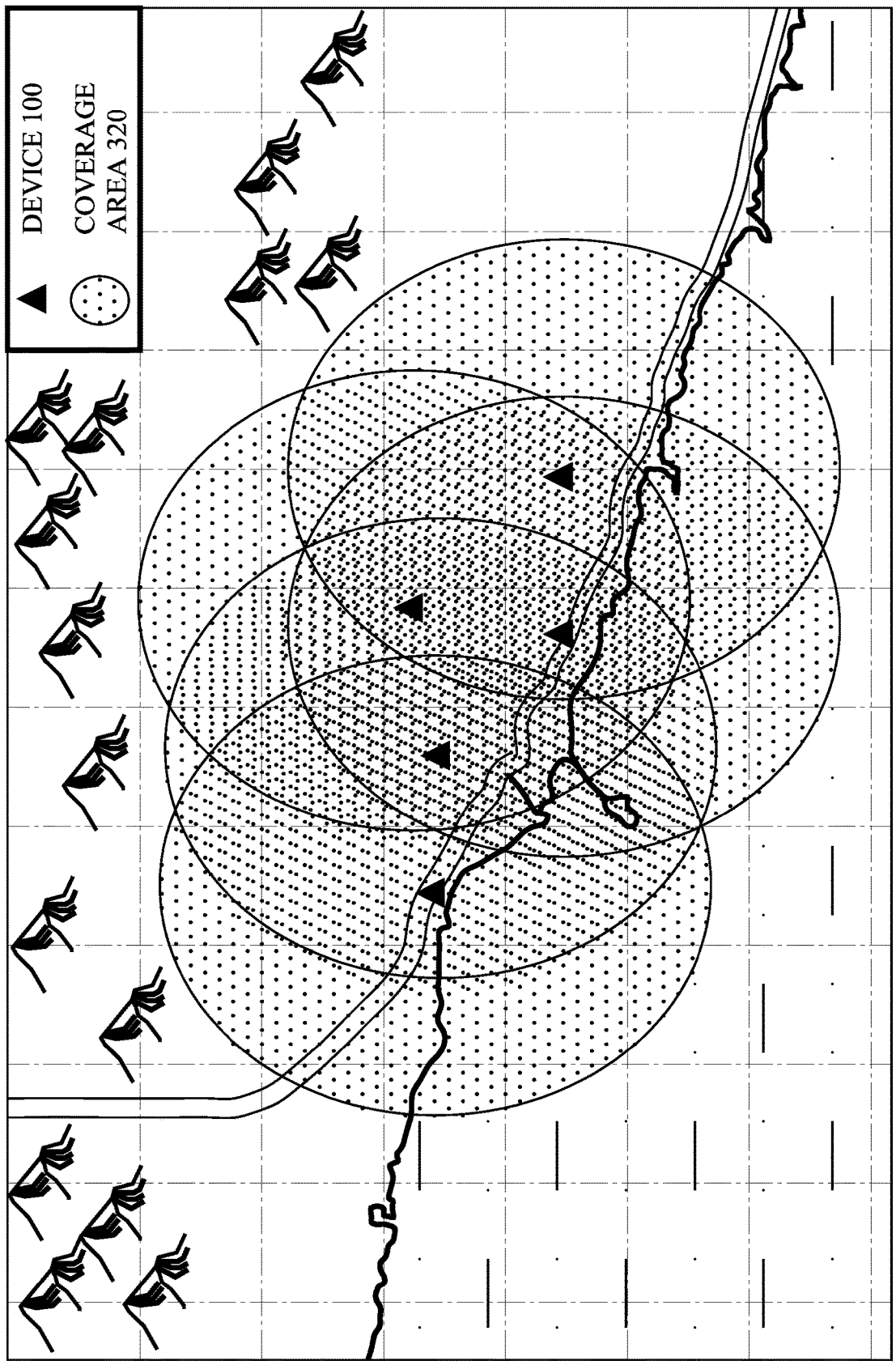

Placement of the devices 100 (cameras 170) affects the monitoring and forecasting ability of the overall system as described below, so generally the devices should be geographically diverse. Ground-based mounting locations, such as building rooftops, residential rooftops, parking lots, utility poles, smoke stacks, water towers, or even vehicles can be spaced out in a manner that maintains adequate coverage of sky/cloud imaging and measurement for a given widespread area of observation. As shown in the example map 300b of FIG. 3B, each device 100 may be associated with a given coverage area 320 according to the camera of each device having a particular field-of-view (FOV). (Note that camera FOVs are related to the cloud base height or "CBH", as may be appreciated by those skilled in the art. As such, the illustrative coverage areas 320 are merely representations of overlapping regions of coverage, e.g., based on using the mean atmospheric inversion height (900 m) to calculate the FOV.) Device/camera location may be determined to maximize the overall coverage area, including whether prevailing winds exist (e.g., trade winds), such that cloud observations can be made upwind of the desired circuit as well to assist with accurate forecasting. Furthermore, spacing between the devices/cameras can be set to best accommodate estimating cloud height (CBH) from stereo photogrammetric techniques, as described below (e.g., approx. 500-2000 meters apart given an example FOV herein).

—Monitoring and Forecasting Procedure—

According to the present disclosure, techniques are described herein that generate nowcast (current to near future) and forecast (near future to reasonably distant future) irradiance maps and PV power predictions based on observing the images taken by an omnidirectional and ultra-panoramic camera 170 as described above (and optionally irradiance sensor data from pyranometer 175). In particular, the techniques herein may be performed by irradiance prediction process 147, in combination with camera control process 146 and distributed coordination process 148 where necessary. Note that the following techniques and computations can occur computationally within the computing device 100, allowing for only information necessary for grid management or power system control to be sent from the device in real-time, saving power, communication bandwidth, and remote data storage and processing, accordingly. Also note that while each section below is described in a particular order, the order of the sections need not be strictly adhered to during operation of the techniques herein.

Image Capture

Figure 4A:
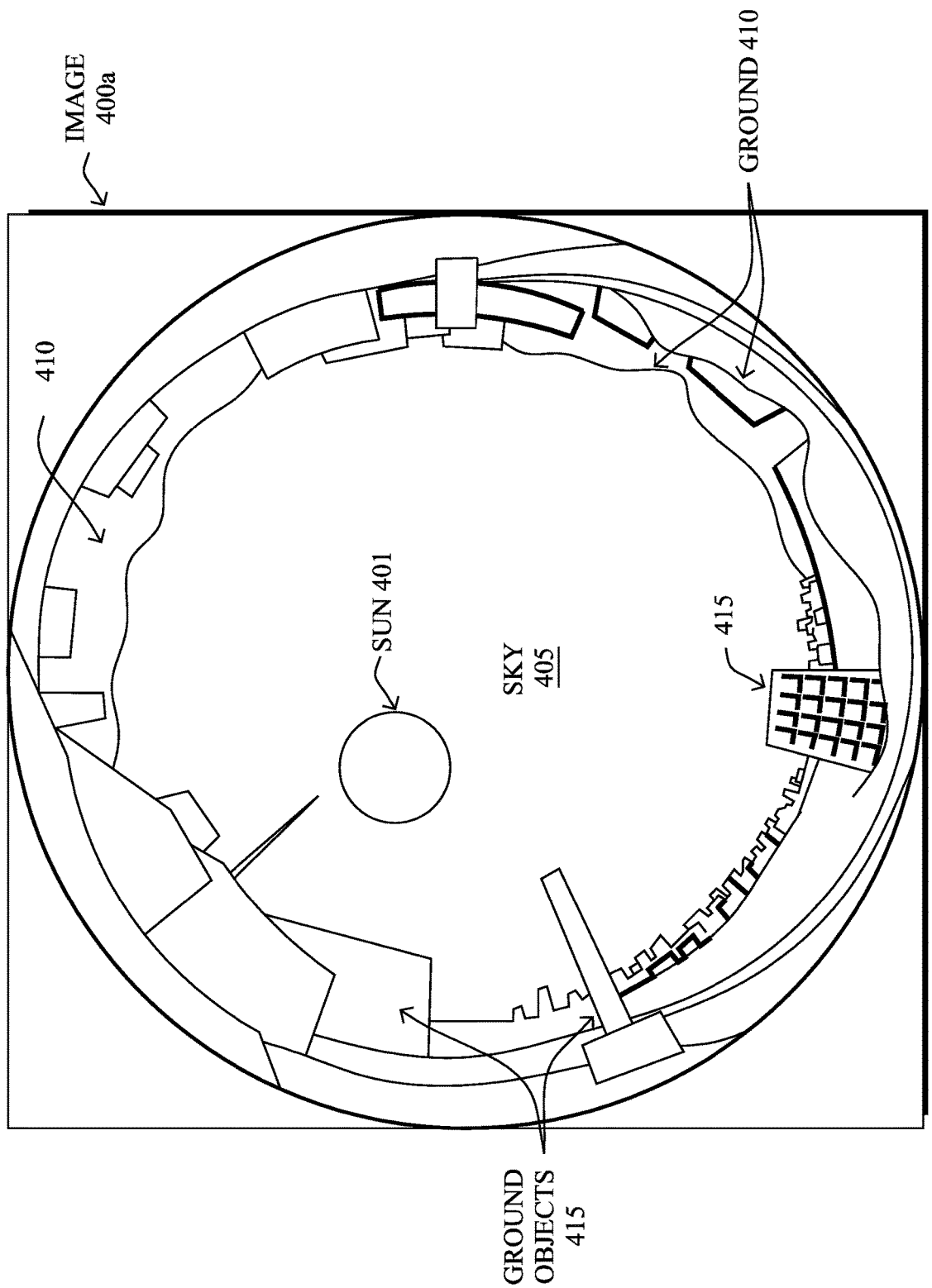
FIGS. 4A-4C illustrate example images from an omnidirectional ultra-panoramic camera located at a ground-based mounting location and having a view of an entire sky located above the camera and a horizon-to-horizon view of ground and ground-based objects surrounding the camera.
Figure 4B:
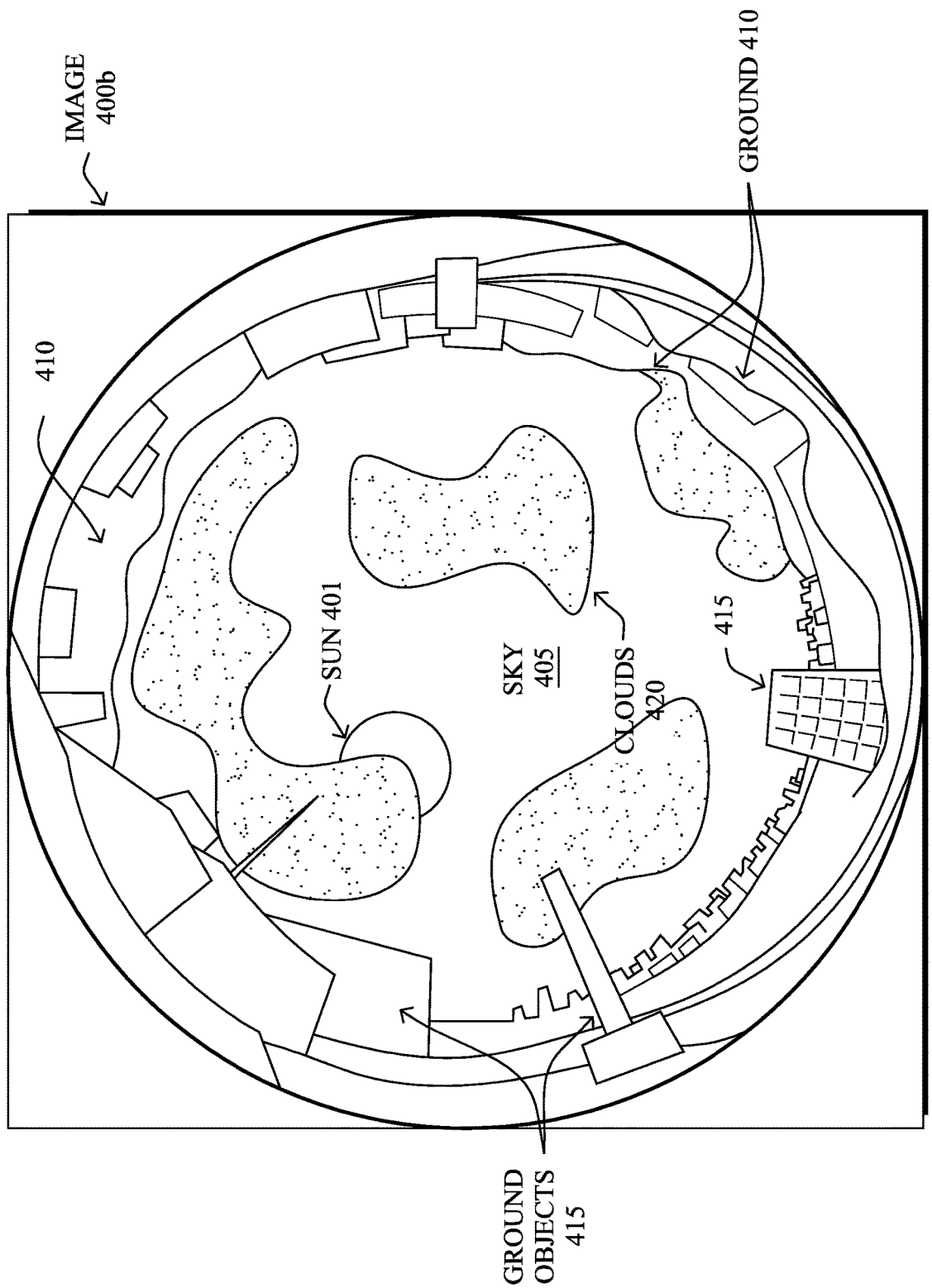
Figure 4C:
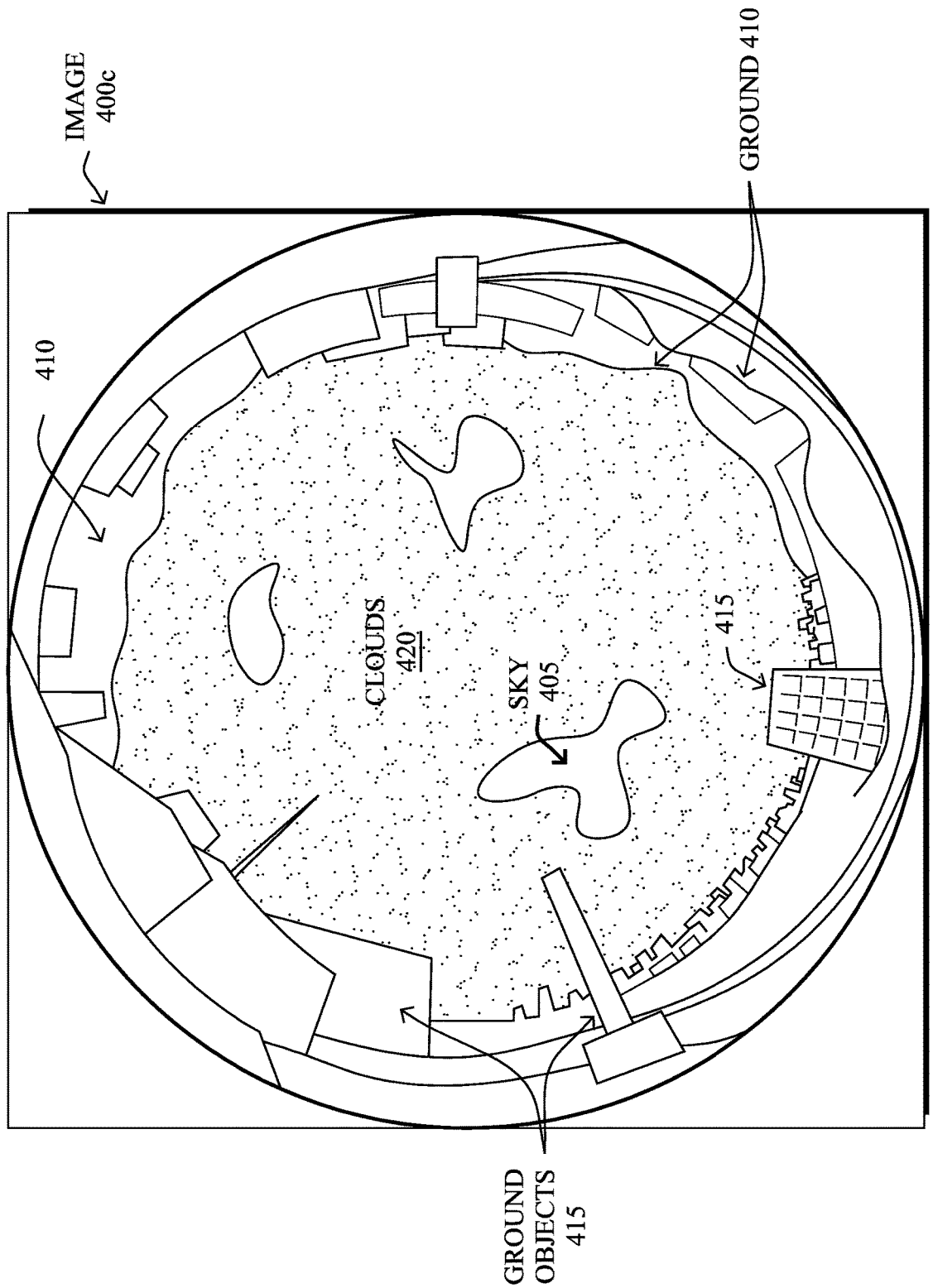

The techniques herein allow for the computing device 100 to receive image data for a picture having a view of an entire sky located above the camera, as well as a horizon-to-horizon view of the ground and various ground-based objects surrounding the camera. For instance, FIGS. 4A-4C illustrate examples of raw image captures 400 (400a-400c, respectively), where, within the generally rounded image (e.g., due to the "fish-eye" nature of an omnidirectional ultra-panoramic camera), the entire sky 405 (the portion unobstructed to the camera's FOV) is shown surrounded by the ground 410 and any ground-based objects 415, such as buildings, bridges, towers, and so on. As shown in FIG. 4A, image 400a has a clear sky, and the sun 401 is in clear view. Image 400b of FIG. 4B illustrates the presence of clouds 420 (e.g., "partly cloudy" and currently covering the sun 401), while FIG. 4C demonstrates an image 400c where clouds 420 generally fill (and cover) the sky 405.

According to one or more aspects of the techniques herein, the raw images (as taken or as a periodic/streaming service) can be separated into channels by the camera (or process 147), assigned metadata, and archived into local memory or sent to a central database.

Camera Calibration

The techniques herein calibrate (and periodically recalibrate) the camera using image ground control points and a high-resolution digital elevation model. Camera calibration is the process of determining parameters that define the relationship between pixel locations and real world 3D coordinates. The parameters are commonly broken into two groups: intrinsic parameters, which describe the optical properties of the camera; and extrinsic parameters, which define the camera's position and orientation.

Intrinsic calibration may be performed for each camera prior to deployment in the field (e.g., shape of lens, FOV, image sensor type, mode, etc.). Notably, because the omnidirectional camera FOV extends beyond 90° from the optical axis, standard calibration methods are not applicable. Intrinsic parameters may be estimated using an imaging function described by a Taylor series expansion, as may be appreciated by those skilled in the art (e.g., coefficients may be solved for using images of a checkerboard pattern in different orientations relative to the camera and a four-step least squares linear minimization, followed by non-linear refinement based on maximum likelihood criterion).

Extrinsic calibration is performed periodically as the camera operates (e.g., in case the camera is moved). To determine the extrinsic calibration parameters, the techniques herein define an automated method where image features (e.g., ground features 410 or ground-based objects 415 from images 400) are matched against landmarks with known positions. The orientation and position of the camera 170 can then be determined by finding identifiable terrain features in an image, projecting that image point to real-world 3D coordinates, and comparing against a high-resolution digital elevation model (DEM). (Note that extrinsic parameters may be solved using least squares minimization.) In this manner, by having a camera with a full view of the sky and the surrounding horizon (not available with conventional 160°-170° cameras that can't see the ground at the same time as the sky), processing the images 400 against a database of known ground features according to the techniques herein allows for a determination that the camera is located in a particular location and orientation.

Alternative mechanisms may also be used for extrinsic calibration, such as global positioning systems (GPS), electronic levels, compasses, gyros, etc. However, the image-based extrinsic calculations described herein save the added costs of such components.

Initial Image Processing

Image processing herein generally relates to pixel classification, where each image 400 may be passed through a series of analysis, enhancement, and segmentation algorithms to allow each pixel to be identified generally as sky, ground, or sun. That is, the raw image file provided by the camera may be separated into red, green, and blue channels, and each pixel in the image is assigned a viewing angle and geometric information using the camera specific intrinsic calibration parameters. Pixels are then classified as sky, land/ground, or sun, accordingly. (Note that if the entire solar disk is in view, solar image characteristics can also be determined and logged.)

Cloud Detection and Classification

To detect clouds, the images 400 are examined to identify cloud-containing pixels, which can then be classified into a "transparency category" (attenuation level). In particular, according to one or more embodiments herein, clouds may be identified in the images using relative color differences between relatively white clouds and normally blue skies. Spatial variations in the imagery due to aerosol, airmass and solar effects may be removed/minimized using threshold maps that vary as a function of pixel elevation, solar position, and image azimuth. Brightness (BRI) and red-blue ratio (RBR) images may then be computed and pixels may then be identified as cloud or clear sky by evaluating the RBR and BRI values.

Cloud containing pixels may then be categorized into bins that represent expected attenuation differences. For instance, example bins may comprise: (1) low RBR and low BRI, indicating thin clouds with low attenuation levels; (2) high RBR and high BRI, indicating bright, thick clouds with moderate attenuation levels; and (3) medium RBR and low BRI, indicating dark, thick clouds with high attenuation levels. (This information may be saved into a network Common Data Form (NetCDF) format and archived—NetCDF is a self-describing, machine-independent, array-oriented scientific data format developed at the University Corporation for Atmospheric Research (UCAR).)

Figure 5:
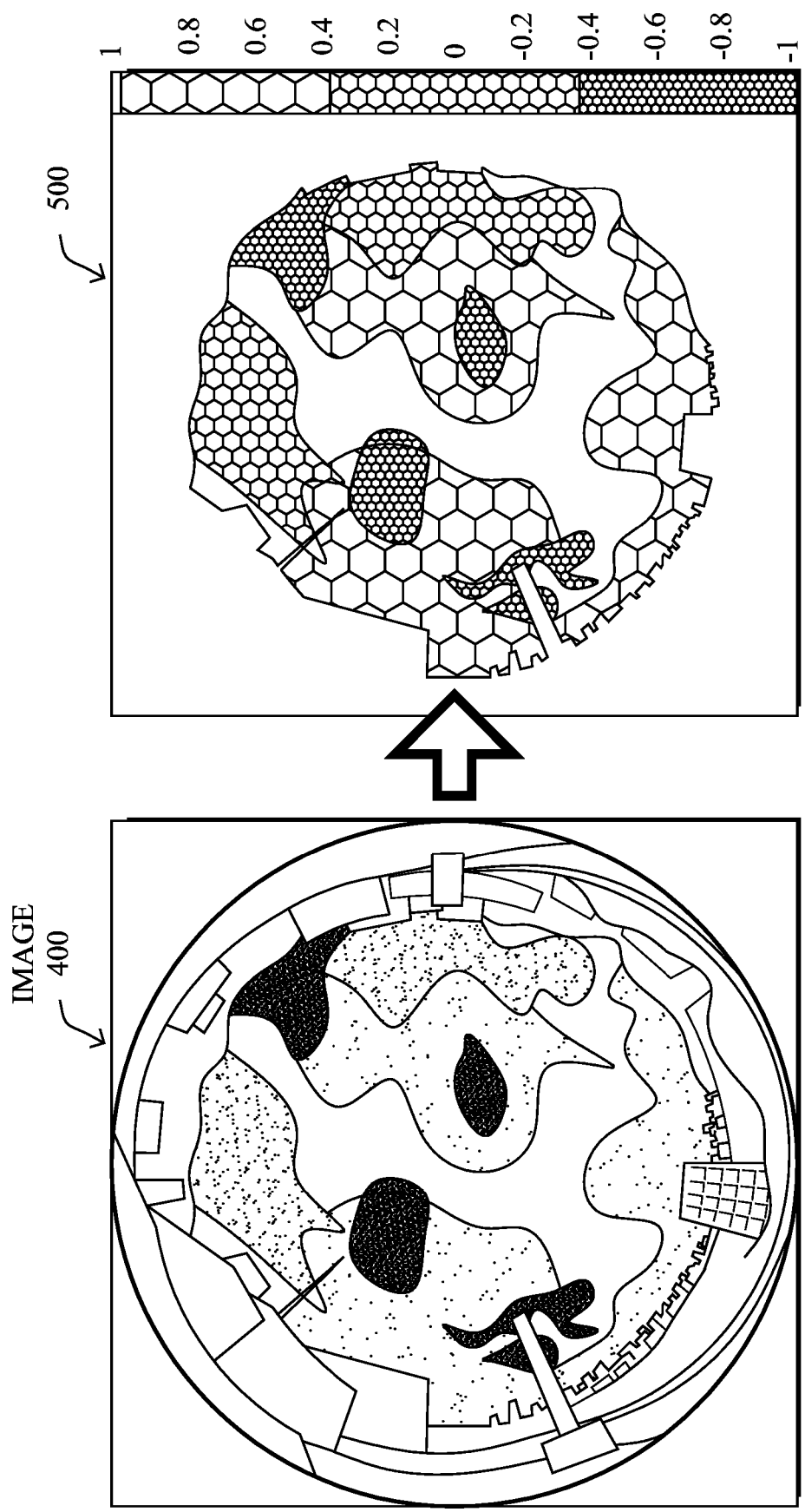
FIG. 5 illustrates an example comparison between a raw image from the camera and a resulting cloud map.

FIG. 5 illustrates an example of a raw image 400 from the camera and the resulting cloud map 500, where clear sky is indicated by values closer to "1" and thick/dark clouds by values closer to "−1". The range of attenuation/transparency levels can be any defined scale, and the image shown in FIG. 5 is merely for demonstration of mapping clouds with varying transparencies based on raw images, accordingly.

Note further that once cloud boundaries are established, large clouds may be assigned an identifier (ID) and characteristics may be calculated, logged, and tracked according to the techniques described herein (e.g., for forecasting, described below).

Cloud Motion Vectors

Cloud motion vectors (CMVs) can be used to georegister clouds, determine if multiple layers of motion exist, and predict future cloud locations and cloud shadow forecasts. CMVs or cloud velocities can be estimated using a pattern tracking technique such as determining CMVs using cloud feature displacements in sequential images. For instance, in one embodiment, CMVs may be determined by using a maximum cross correlation (MCC) method, a fully automated, robust pattern tracking algorithm, which cross correlates a template sub-window in an initial image with all possible sub-windows of the same size that fall within the search window of a second (sequential) image. The location of the sub-window in the second image that produces the highest cross correlation with the sub-window in the first image indicates the most likely displacement of that feature. Cloud velocities may also be estimated by applying the MCC method to coincident georegistered cloud patterns and dividing the displacement vectors by the time separation between the images.

Figure 6:
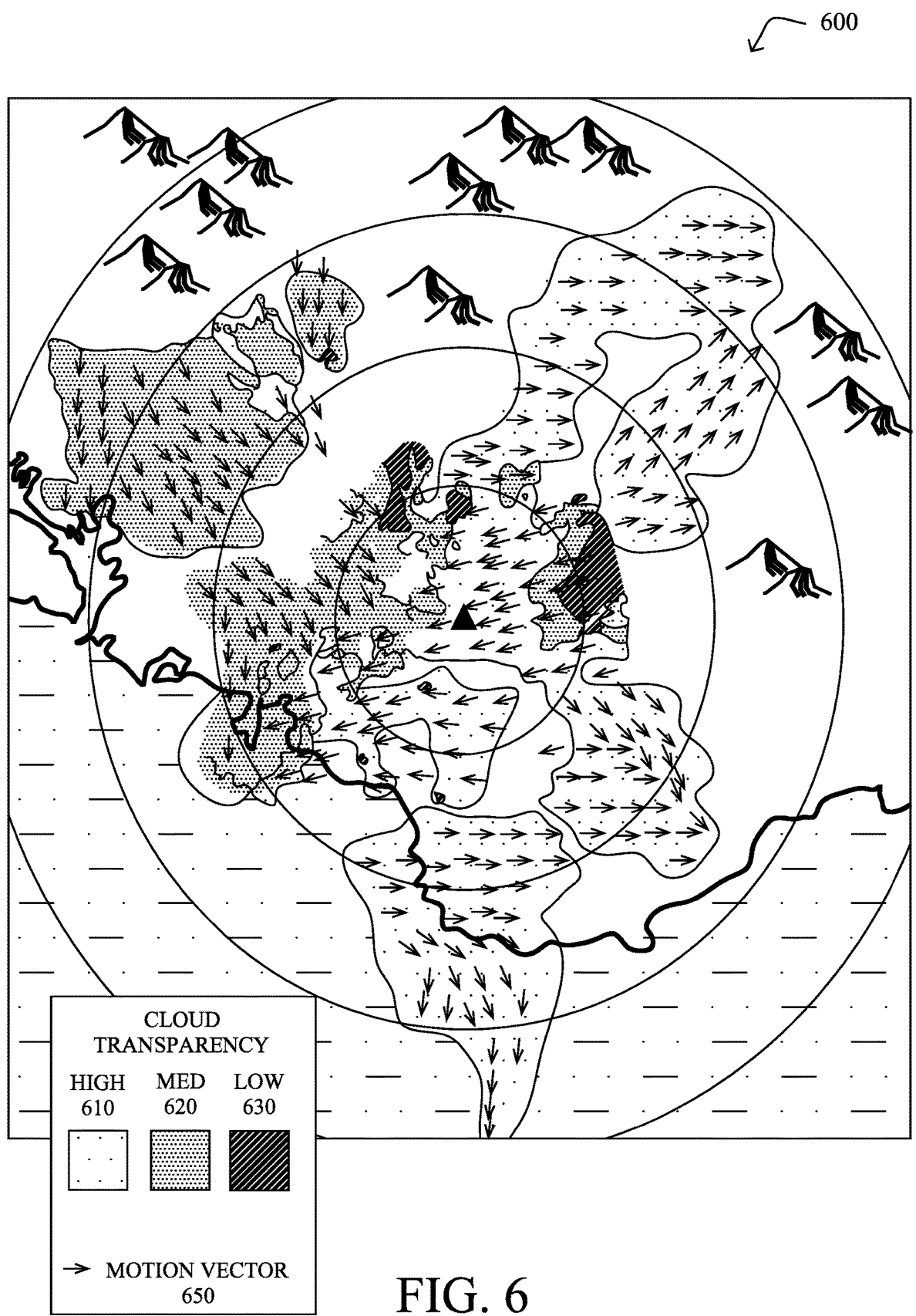
FIG. 6 illustrates an example determination of cloud transparency and cloud motion vectors.

FIG. 6 illustrates an example 600 of cloud transparency (high transparency clouds 610, medium transparency clouds 620, and low transparency clouds 630) and cloud motion vectors 650. As shown, different clouds in different locations (e.g., and heights) may have different CMVs 650 for various reasons as will be appreciated by those skilled in the art. Note that the CMVs can be compared to various external sources of information, such as current wind speeds, winds aloft, expected trade winds, and so on, for further validation of the data and for use in data anomaly detection.

Cloud Georegistration

Figure 7:
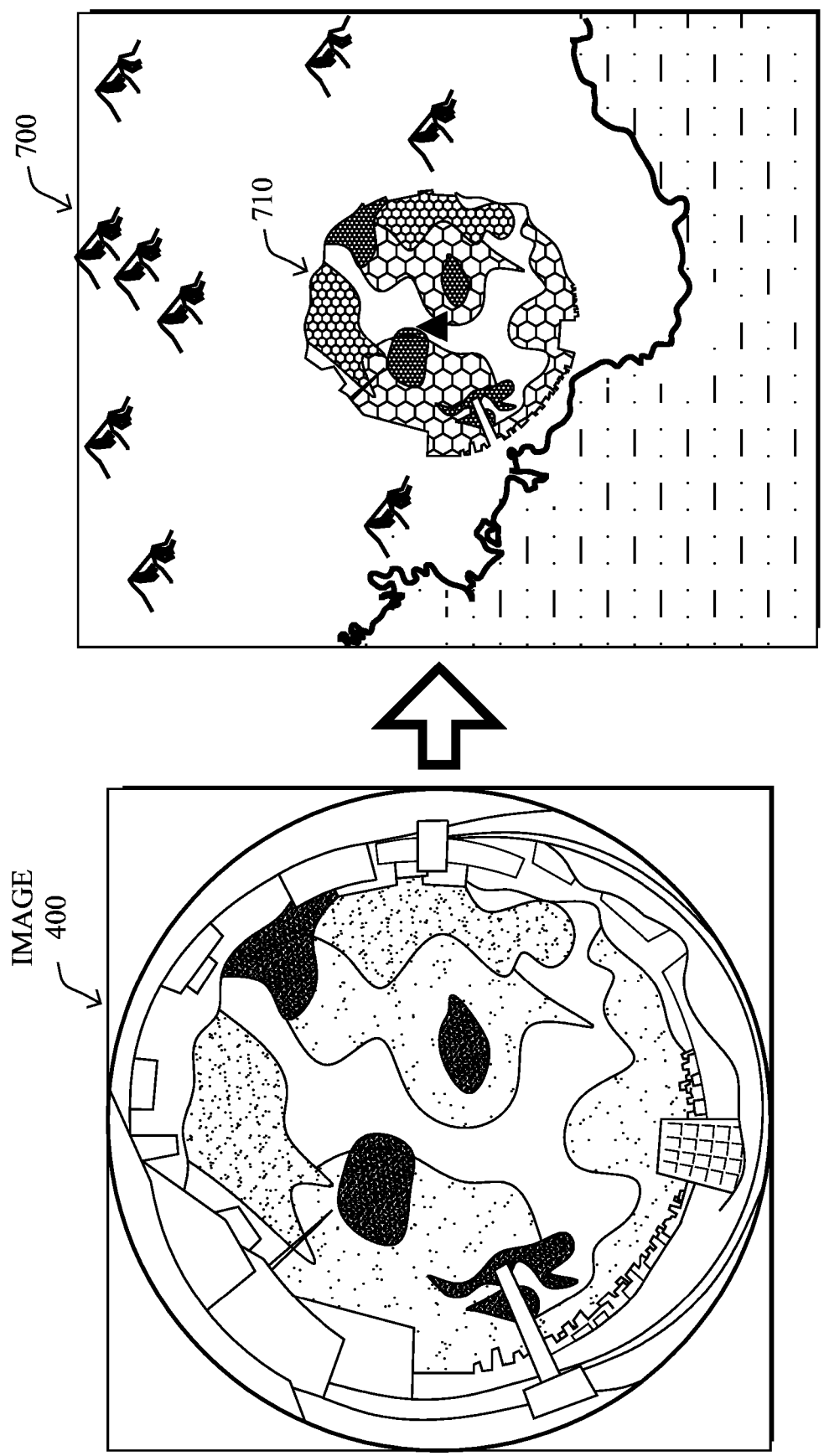
FIG. 7 illustrates an example of a raw sky image and associated georegistered cloud map.

Georegistration is the process of assigning a spatial location (e.g., latitude, longitude, and optionally height) to a remotely sensed observation. FIG. 7 illustrates a simplified example of the correlation between raw sky images 400 and a georegistered cloud map 700, where clouds/shadows 710 are located within real-world 3D coordinates. Cloud-containing pixels may be georegistered herein to estimated horizontal earth-referenced positions using the following multi-step procedure.

First, the techniques herein determine the extrinsic calibration parameters, as described above (e.g., matching image features against landmarks with known positions and projecting that image point to real-world coordinates).

Figure 8:
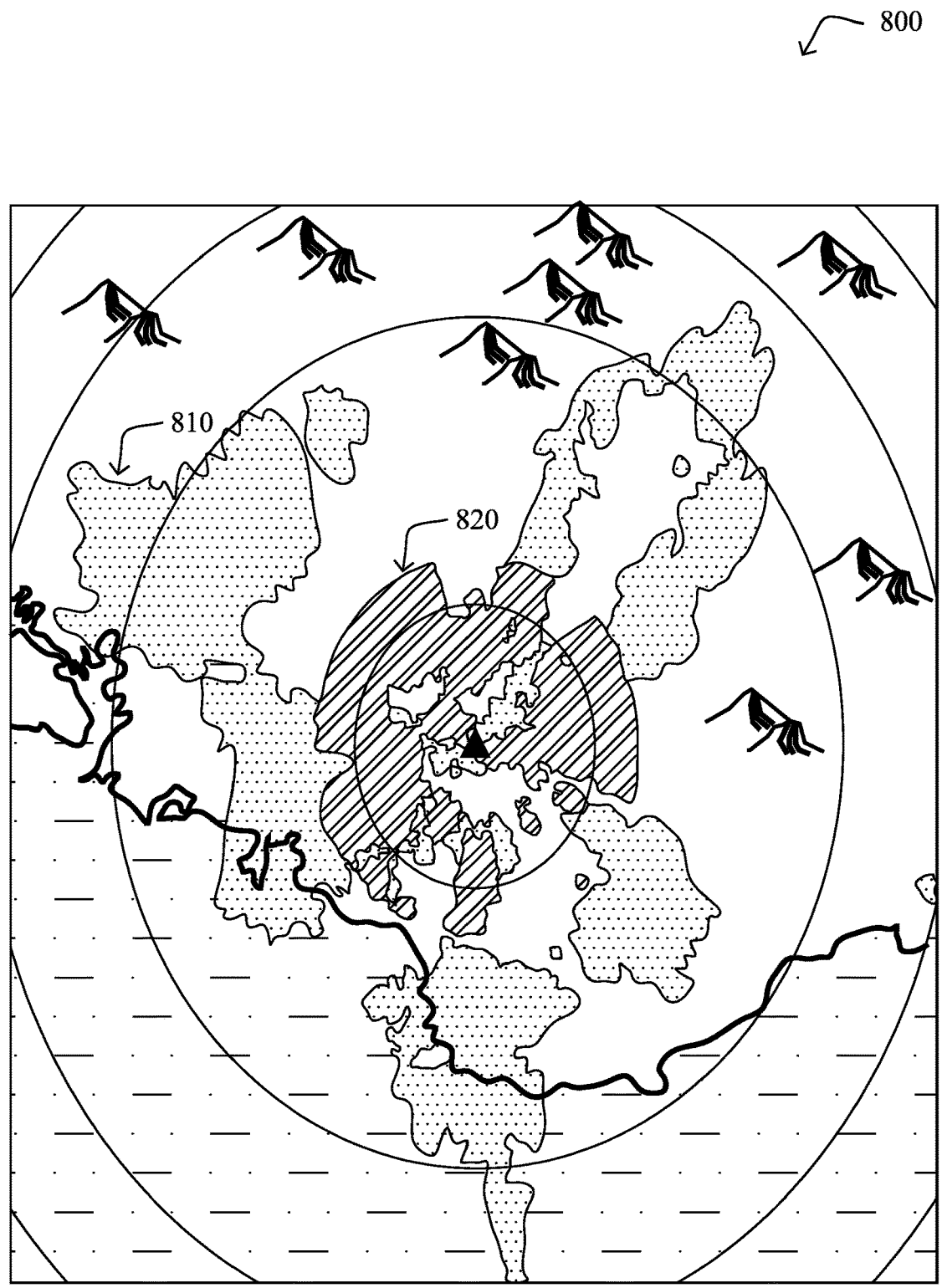
FIG. 8 illustrates an example determination of cloud layering.

Second, the techniques herein determine if clouds are being advected on a single level or if multiple layers of motion exist. This may be accomplished by applying the MCC method to sequential raw images and applying a clustering algorithm to the resulting CMVs. If multiple layers are detected, the techniques herein can assign a relative cloud level using the assumptions that: (1) lower levels clouds are often advected by prevailing trades; (2) relative to the camera, lower level clouds will appear to be moving slower; and (3) lower clouds are brighter and more opaque. FIG. 8 illustrates a simplified example 800 of cloud layering, with high-level clouds 810 and low-level clouds 820. (Note that many different layers of clouds may be classified, and the use of two (high/low) is merely one example implementation.)

Figure 9:
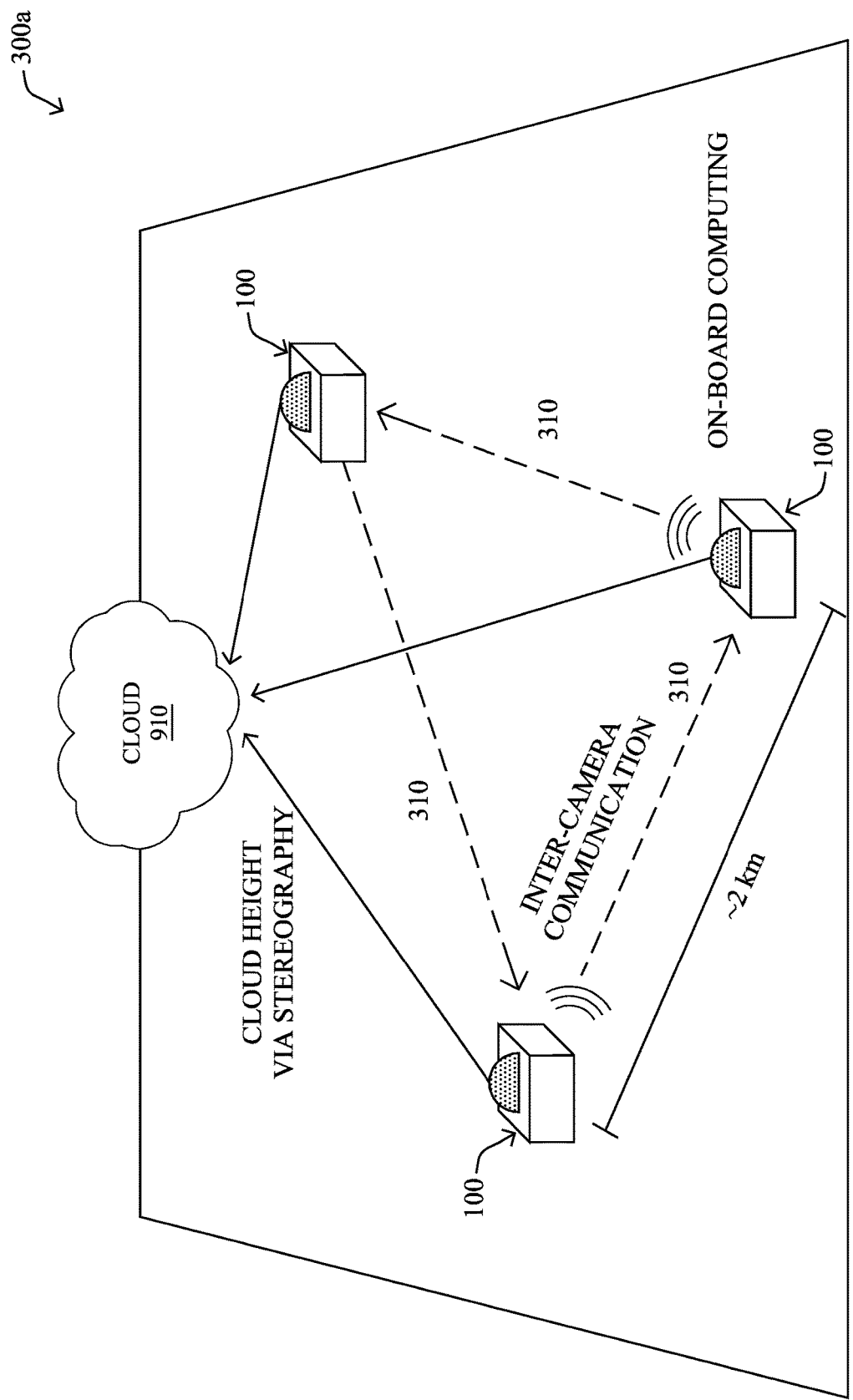
FIG. 9 illustrates an example determination of cloud-base-height (CBH) using stereographic methods with multiple computing devices.

Next, according to one or more specific embodiments herein, the techniques herein may determine the height of the clouds or cloud level. In one embodiment, a ceilometer can be used to estimate cloud-base-height (CBH) directly over the device 100 (camera 170). The image can then be unwrapped to a horizontal earth-referenced level using a geometric transformation, based on camera lens geometry and recent CBH data. In an alternative (and preferred) embodiment, computing devices 100 may coordinate their data to use stereographic methods (stereo photogrammetric techniques) to estimate CBH by applying the MCC method to coincident images from neighboring cameras and utilizing epipolar geometry. For example, with reference to FIG. 9, the coordinated communication system 300a from FIG. 3A above is shown where image data from multiple devices 100 regarding clouds 910 can be shared with each other in order to apply the stereographic height determination methods herein. Other techniques for determining or estimating cloud height may also be used herein, such as infrared cameras to determine cloud temperature which can then be matched numerically to models determine height, or still other possible measures for cloud height.

Finally, earth-referenced cloud positions are then determined from the CBH data and camera calibration parameters. The cloud position estimates are then interpolated to a regular grid, which is dependent on the geometry of the camera deployment and mean cloud height. Note that either cloud positions can be used, or else cloud shadow locations can be further determined based on simple geometry calculations according to sun position and terrain mapping of the real-world space. ("Cloud position" as used herein may imply either mapping clouds in the air or mapping cloud shadows on the ground, accordingly.)

Irradiance Mapping

Irradiance information may be used herein to address the variable nature of power generated by photovoltaic systems. The techniques herein may thus generate nowcast (current) maps of global, diffuse, and direct irradiance according to a clear sky irradiance model (irradiance with no clouds) and based on the computer cloud shadow estimates above. For instance, clear sky irradiance can be simulated from statistical models, such as the known Ineichen clear sky model, which take into account: the earth-relative solar position, air mass, the Rayleigh optical thickness for a clean-clear atmosphere, and climatological atmospheric turbidity. Cloud attenuation may then be estimated from information provided by the cloud detection and classification algorithms described above, calibrated by recent pyranometer observations. Assuming the cloud georegistration has not yet projected the shadows to the ground, then this attenuation may be projected to the surface using the CBH data and the position of the sun, which is computed numerically.

Figure 10:
FIG. 10 illustrates an example of a generated irradiance map.

FIG. 10 illustrates a simplified irradiance map 1000 (e.g., computed according to the illustrative clouds from FIG. 8 above). In particular, though much finer granularity may be achieved in real-world computation systems, FIG. 10 illustrates various levels of irradiance, from high irradiance 1010 (e.g., clear sky irradiance), to medium irradiance 1020 (e.g., upper-atmospheric cloud cover slightly reduces irradiance), to low irradiance 1030 (e.g., where larger/thicker low-level clouds are passing over the ground, greatly reducing irradiance). Again, FIG. 10 is merely an example demonstration and not meant to limit the scope of the present disclosure, as irradiance maps may be able to specifically classify each location on a map with an estimated irradiance value (e.g., in W/m^2, rather than merely "low, medium, high") according to the cloud geolocation and statistical models above.

Irradiance Forecasting

Using the most recent cloud data as initial conditions, cloud forecasts may be generated using a fluid dynamics/finite elements solver (e.g., based on the known Navier-Stokes equations, as will be understood by those skilled the art), driven by the cloud velocity field (e.g., based on a simulated advection-diffusion model). This method works well in terms of stability and speed, and because it can be advanced to arbitrary time steps into the future. Irradiance forecast maps for those future cloud conditions may then be generated by recomputing the clear sky irradiance, solar position, and taking account forecasted cloud attenuation. Forecast maps can be determined in particular intervals (e.g., computing one forecast every 30 minutes for the next 30 minutes) or else on a rolling basis (e.g., computed every minute to predict irradiance for the next 30 minutes), or at any other interval and duration as deemed appropriate for a particular system implementation.

Figure 11:
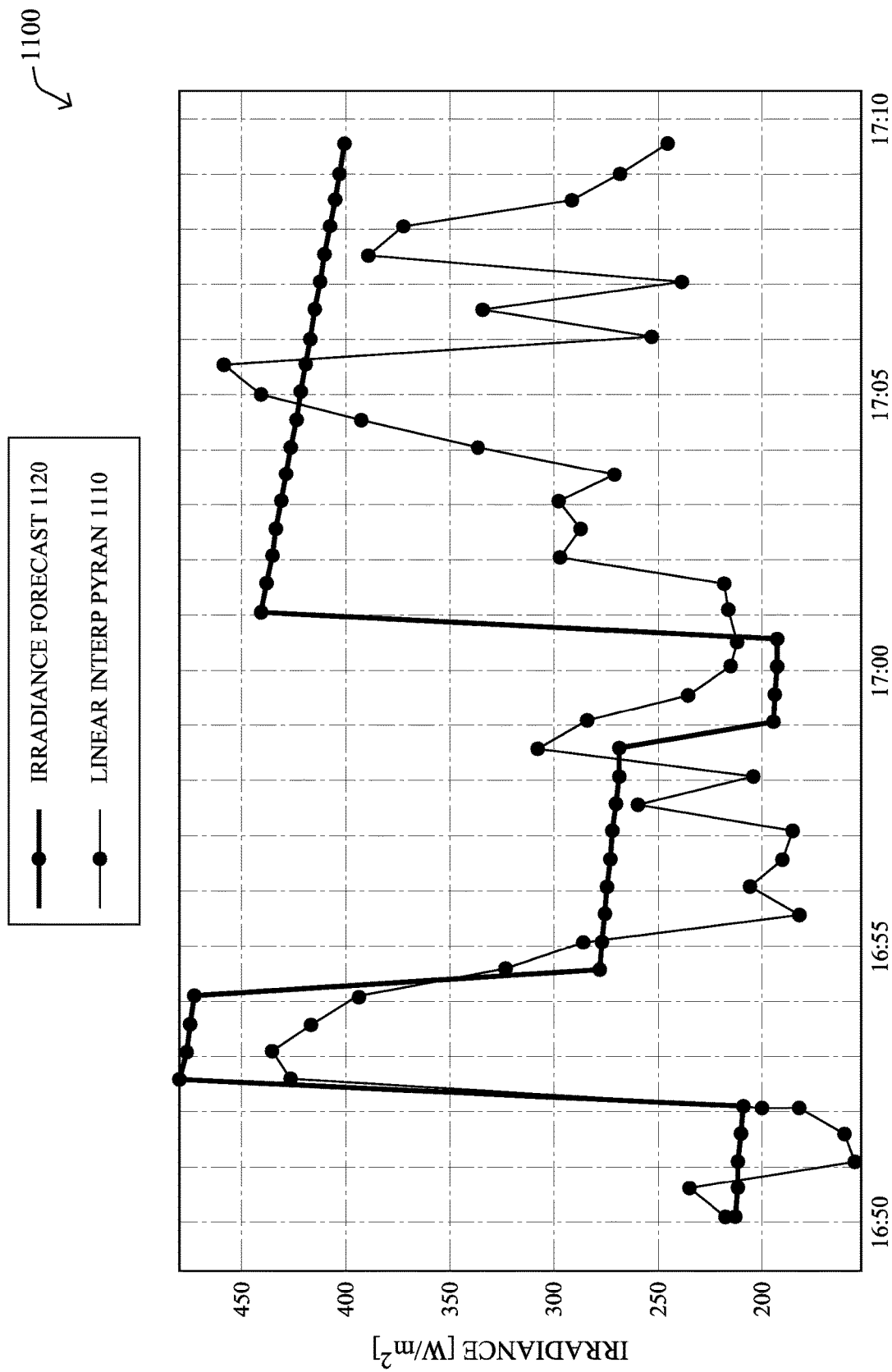
FIG. 11 illustrates an example of an irradiance forecast and corresponding pyranometer observations.

FIG. 11 illustrates an example graph 1100 showing both pyranometer observations 1110 (e.g., linearly interpolated pyranometer observations or "linear interp pyran") and an irradiance forecast 1120 computed according to the techniques described above. As can be seen in the illustrative example, the irradiance forecast 1120 (e.g., over a course of 20 minutes) closely tracks the observed irradiance 1110, with several noticeable differences due to forecasting error and variability of cloud movement and coverage.

Note that the techniques herein may also compare the forecast results to the pyranometer observations for both metric tracking as well as for recalibration (e.g., adjusting future forecasts based on the lower current pyranometer observations or else based on consistently higher or lower observations over time). For instance, if the forecast is for a certain irradiance forecast at one instant, and then a second, lower irradiance forecast at a subsequent instant, then by comparing the pyranometer observations at the first instant to the forecast, if the pyranometer observations was lower than the estimate, the second irradiance forecast may (though need not) be lowered accordingly. Various statistical models and machine-learning-based computations may be used to determine when/whether it is appropriate to adjust the estimated forecasts based on current observations, as may be appreciated by those skilled in the art.

PV Power Nowcast and Forecast

According to one or more embodiments of the techniques herein, solar photovoltaic (PV) power generation may be further estimated from the irradiance estimates, a database of PV information (e.g., model, rating, location, and orientation), and PV power generation models (e.g., the known "PVWATTS V5" model created at the National Renewable Energy Laboratory (NREL)). That is, by using a PV system simulation tool and a database of PV panel/array geographic locations, orientations, nameplate values, and inverter type (e.g., DC power generation, or AC power if the inverter model is available), PV power generation can be estimated.

Figure 12:
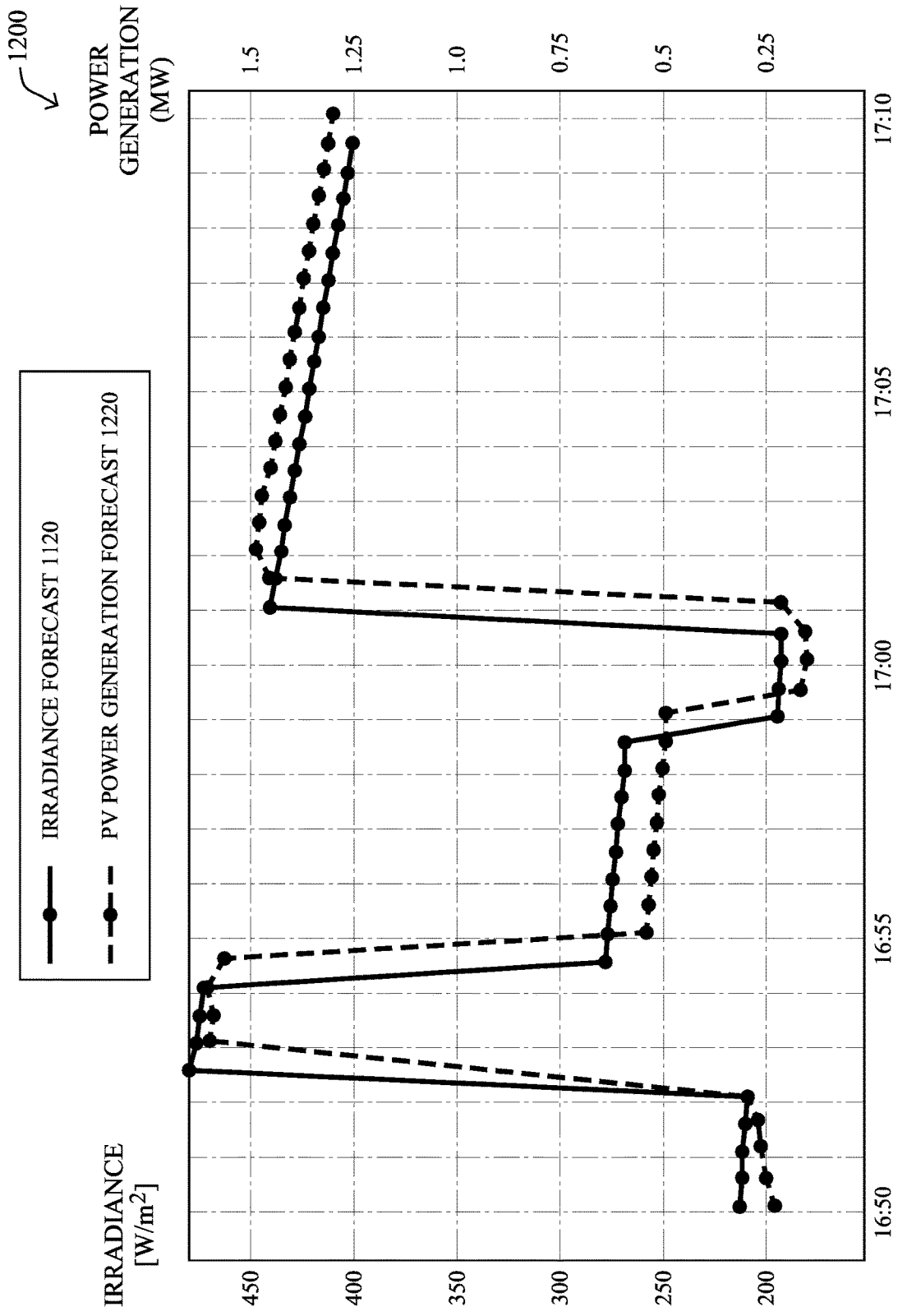
FIG. 12 illustrates an example prediction of photovoltaic (PV) power generation according to the irradiance map.

FIG. 12 illustrates an example graph 1200 showing the irradiance forecast 1120 from FIG. 11 above, with corresponding estimates for PC power generation (forecast) 1220 determined according to the techniques herein. For instance, by correlating known locations of PV panels/arrays with the irradiance maps 1000 and the irradiance forecasts 1120, an estimate of PV power determination (e.g., for a single PV panel or a grid/array of PV devices) by mathematically calculating the PV panel power output according to the estimated level of irradiance at that PV panel, and adding computations together for a plurality of panels (e.g., for an array, a grid with multiple PV power sources, and so on).

The forecasting framework described above, therefore, provides information for advanced microgrid controls, in order to provide reliable and resilient energy using solar PV power coordinated with microgrid assets such as energy storage, allowing solar resources to be used as spinning reserve support. That is, ground-based sky imagers and supporting instruments have been defined to generate local, high-resolution, minute-ahead (MA) forecasts. Notably, the techniques herein need not be limited to use in isolation. That is, the forecasts herein can be compared/calibrated to other forecasting systems, such as hour-ahead (HA) or day-ahead (DA) systems as will be understood by those skilled in the art (e.g., satellite cloud mapping and motion HA techniques, regional numerical weather prediction (NWP) DA techniques, etc.), thus allowing an operational forecasting system that combines overlapping DA, HA, and MA forecasts using ensemble methodologies. (Along with irradiance forecasts, the techniques herein can thus also provide predictions of irradiance variability and error metrics.)

Figure 13:
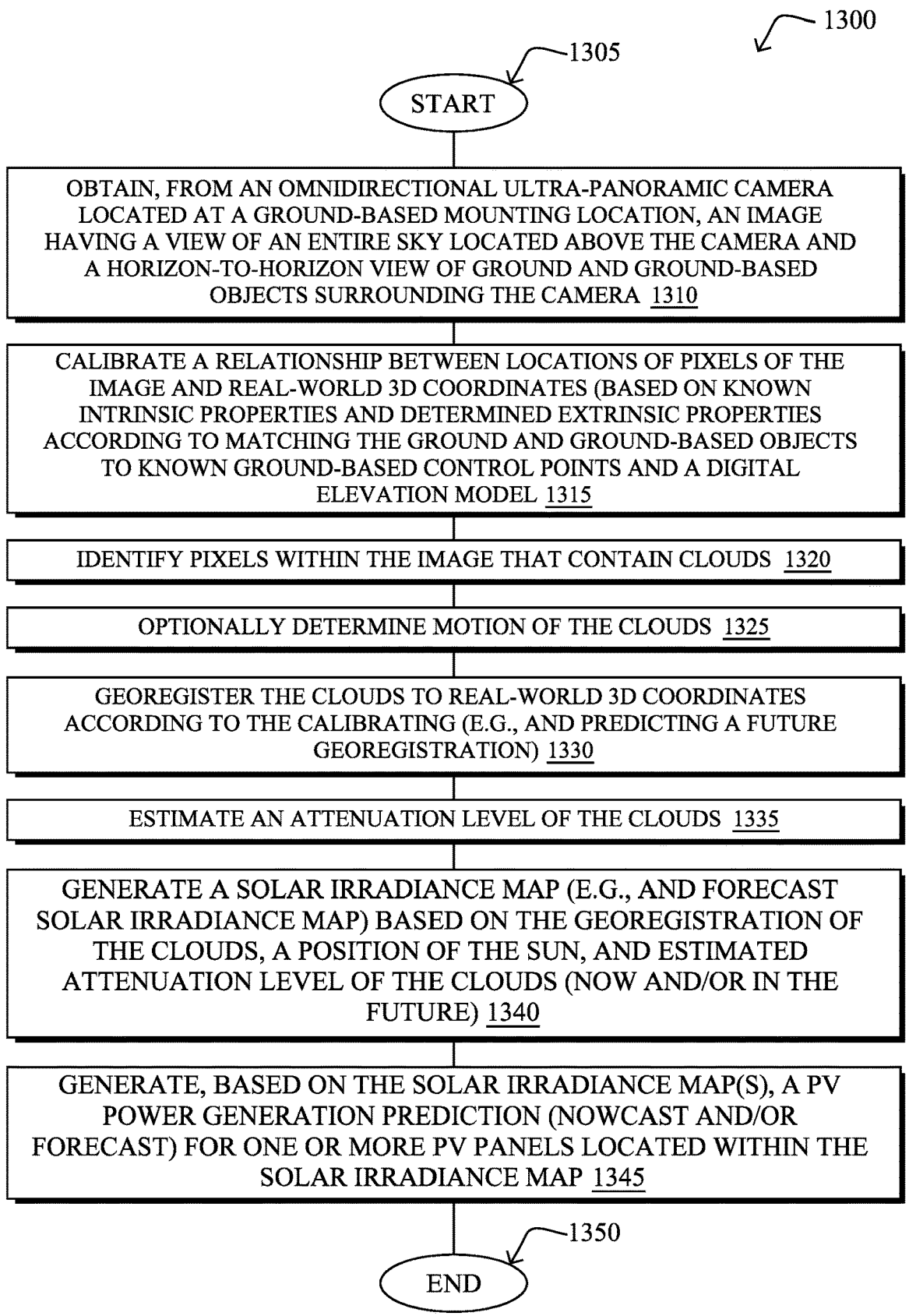
FIG. 13 illustrates an example simplified procedure for a ground-based sky imaging and irradiance prediction system.

To reiterate, generally, the techniques described above, FIG. 13 illustrates an example simplified procedure 1300 for a ground-based sky imaging and irradiance prediction system in accordance with one or more embodiments described herein. For example, a non-generic, specifically configured device 100 (e.g., a computing device or controller) may perform procedure 1300 by executing stored instructions (e.g., a process stored in memory or as configuration of a microprocessor). The procedure 1300 may start at step 1305, and continues to steps 1310, where, as described in greater detail above, a computing device 100 obtains, from an omnidirectional ultra-panoramic camera 170 located at a ground-based mounting location, an image 400 having a view of an entire sky located above the camera and a horizon-to-horizon view of ground and ground-based objects surrounding the camera. As noted above, the omnidirectional ultra-panoramic camera may have a 360-degree panoramic view with a horizon-to-horizon field-of-view (FOV) that is greater than 180 degrees (e.g., a 230-degree FOV).

In step 1315, the computing device (re-)calibrates a relationship between locations of pixels of the image and real-world three-dimensional coordinates based on known intrinsic properties of the camera (e.g., optical properties of the camera determined and calibrated prior to deployment of the device) and determined extrinsic position and orientation properties of the camera. In particular, as described above, extrinsic properties can be calibrated according to matching the horizon-to-horizon view of ground and ground-based objects surrounding the camera to known ground-based control points and a digital elevation model associated with the ground-based mounting location. In other words, image features are matched against landmarks with known positions, such that the orientation and position of the camera within real-world coordinates can be determined, as described above.

The computing device may then identify, in step 1320 pixels within the image that contain clouds (optionally removing spatial variations from pixels within the image based on threshold mapping). For instance, as described above, clouds may be identified according to relative color differences between white clouds and blue skies (e.g., evaluating brightness (BRI) and red-blue ratio (RBR) values).

In one embodiment, in step 1325, the computing device may additionally determine motion of the clouds, such as based on pattern tracking for cloud feature displacement in sequential images from the camera. Alternatively, cloud velocity of the clouds may be determined by comparing coincident georegistered cloud patterns from sequential images to determine displacement vectors for the clouds, and then dividing the displacement vectors by a time separation between the sequential images. Other techniques for determining cloud motion may also be used, and those mentioned are merely examples. Note further that in certain embodiments, particular clouds above a given threshold pixel size within the image may be identified (e.g., "large" clouds), and then the motion of these particular clouds may be tracked between a plurality of geographically diverse omnidirectional ultra-panoramic cameras (devices 100 and/or cameras 170).

Next, in step 1330, the computing device georegisters the clouds to real-world three-dimensional coordinates according to the calibrating (e.g., estimating horizontal earth-referenced positions and interpolating clouds or cloud shadow locations to a regular grid, as detailed above). Note that in certain embodiments, future georegistration of the clouds may be predicted in this step for a given time in the future based on the motion of the clouds (e.g., based on a simulated advection-diffusion model and/or based on applying one or both of fluid dynamics techniques or finite element solvers to the cloud velocity of the clouds).

According to one or more embodiments of the techniques herein, georegistration in step 1330 may also comprise determining a height of the clouds, such as based on using a ceilometer or infrared-image-based height detection, as described above. Alternatively, height of the clouds may be determined using a stereo photogrammetric technique that applies epipolar geometry to overlapping coincident images from a plurality of omnidirectional ultra-panoramic cameras (e.g., with reference to FIG. 9 above). Also, once height of the clouds is determine, the clouds may be separated into a plurality of layers, such that motion characteristics can be assigned to each of the plurality of layers (so that predicting future georegistration of the clouds can be based on the assigned motion characteristics).

In step 1335, the computing device estimates an attenuation level of the clouds. For instance, the computing device may classify the pixels within the image that contain clouds into one of a plurality of transparency categories based on one or both of a brightness (BRI) of the cloud pixel and a color of the cloud pixel (e.g., RBR), where each of the plurality of transparency categories is associated with a given attenuation level (e.g., low, medium, and high, or else more granularly intelligent categories). Notably, as mentioned above, in certain embodiments, a pyranometer local to the camera may be used to measure solar irradiance data (at the pyranometer), such that the computing device can calibrate the attenuation level of the clouds based on receiving the measured solar irradiance data.

According to the techniques described herein, in step 1340 the computing device may then generate a solar irradiance map based on the georegistration of the clouds, a position of the sun, and estimated attenuation level of the clouds (e.g., and optionally also based on a clear sky irradiance model and/or the height of the clouds). The generated solar irradiance map indicates an estimation of solar irradiance to reach an area of ground surrounding the camera, as described above, and may also be generated as a forecast solar irradiance map (based on the predicted future georegistration of the clouds, a future position of the sun, and the estimated attenuation level of the clouds, i.e., the forecast solar irradiance map indicating a forecast estimation of solar irradiance to reach an area of ground surrounding the camera at/over a given time in the future). Notably, in one or more embodiments herein, a plurality of overlapping coincident images from a plurality of omnidirectional ultra-panoramic cameras located at geographically dispersed ground-based mounting locations can also be coordinated to generate a coordinated solar irradiance map for an area of ground surrounding the plurality of cameras.

In step 1345, the computing device may also generate, based on the solar irradiance map, a photovoltaic (PV) power generation prediction for one or more PV panels located within the solar irradiance map (e.g., based on one or more PV panel characteristics, such as, e.g., type, model, rating, location, orientation, inverter type (direct current (DC) or alternating current (AC) generation), and so on). In accordance with certain forecasting embodiments detailed above, step 1345 may also comprise generating, based on the forecast solar irradiance map, a PV power generation prediction at/over the given time in the future for one or more PV panels located within the solar irradiance map.

The procedure illustratively ends in step 1350, though notably with the ability to obtain new sky images and to generate new irradiance maps and PV power generation predictions over time (e.g., as the images change due to atmospheric changes), accordingly.

It should be noted that while certain steps within the simplified procedure 1300 may be optional as described above, the steps shown in FIG. 13 are merely examples for illustration, and certain other functions may be included or excluded as desired, and certain details mentioned herein may be performed within certain steps, across multiple steps, or in steps not specifically shown for clarity. Further, while a particular order of the steps is shown, this ordering is merely illustrative, and any suitable arrangement of the steps may be utilized without departing from the scope of the embodiments herein.

The techniques described herein, therefore, provide for an affordable ground-based sky imaging and irradiance prediction system. In particular, the techniques herein determine cloud position, velocity, and attenuation level, and use that information to generate high-resolution irradiance nowcasts and forecasts maps, which can then be used for generating PV power predictions. In particular, the irradiance monitoring and solar power forecasting system described herein provides irradiance information to address the short-term variable nature of power generated by PV systems, helping to address the uncertainty related to PV solar power generation. For example, many communities are beginning to see a large deployment of PV systems due to the high cost of electricity, an abundance of sunshine, and government incentives, including a large percentage of residential distributed devices. This increase in residential distributed devices has been problematic for many electric grids particularly those with only a few synchronous generators available for primary frequency response, as well as isolated grids that cannot rely on neighboring grids for backup electrical generation or as a route for excess power. The systems and techniques herein, therefore, are designed to help lay the foundation for a responsive smart grid in these locations.

The techniques herein also improve accuracy and timing for ramp forecasts, compared to modern solar forecasting systems. That is, the most common metric used to determine the accuracy of a solar forecast is the root mean squared error (RMSE) between the measured PV power and the forecasted PV power; a secondary metric is the mean bias error (MBE). Nearly all commercial forecasts are based on satellite data or numerical weather forecasts. The forecast models described herein use ground data, which is more accurate, as ground measurements of irradiance (around 1-3% RMSE) are more accurate than satellite or numerical weather forecast derived irradiance (around 5-10% RMSE); and can provide the temporal information required for ramp prediction, which is not possible using satellites or numerical models. Moreover, modern ground-based forecasting systems are limited by FOV, normally restricted to forecast up to 30 minutes ahead. The low-cost of the components required to assemble the system described herein allows for mass deployment and the combination of output from multiple imagers in order to see past the horizon of any single device, greatly extending the forecasting capabilities of ground based systems.

Additionally, observations generated by the techniques herein have the potential to increase the understanding of the atmosphere, where if ingested into a data assimilative numerical weather prediction model, may increase the predictability of such models, accordingly. (Note that an example data assimilation NWP system is the Weather Research and Forecasting (WRF) Rapid Refresh system, a high-frequency reinitialization model.)

While there have been shown and described illustrative embodiments that provide for an affordable ground-based sky imaging and irradiance prediction system, it is to be understood that various other adaptations and modifications may be made within the spirit and scope of the embodiments herein. For example, while certain embodiments are described herein with respect to certain hardware configurations, the techniques herein are not so limited, and may be used in other configurations, whether more simplistic or more complicated (e.g., high-power TSI systems utilizing the geolocation and attenuation estimation techniques described herein, or simplified camera systems utilizing high-powered geolocation techniques, and so on). Also, while the techniques described above have generally been limited to the discussion of clouds and atmospheric transparency, the techniques herein may also be applied to other shadow-inducing objects, such as moving objects (e.g., planes, blimps, etc.) as well as unmoving objects that create varying shadows based on sun position (e.g., buildings, towers, trees, etc.) can also be included within the generation of irradiance maps and PV power prediction calculations.

Further, though the techniques herein did not specifically discuss the angular consideration of PV panels, the PV power generation prediction.

Moreover, while the techniques described above are generally related to power grids with PV generation components, the embodiments herein may be applied to any type of power system with one or more PV generation components, whether standalone PV panels, farms of PV panels, PV panels in combination with other power-generation systems (e.g., hydro-electric, nuclear, etc.), and so on, as any PV-based system would benefit from the irradiance prediction and PV power generation prediction techniques herein. For example, residential PV systems, along with the advent of smart home technology (e.g., intelligently controlling energy use and storage), can benefit from PV prediction according to the techniques herein. Furthermore, advanced transportation navigation (e.g., for automated vehicles, automated train switching, drones, unmanned aerial vehicles (UAVs), and so on) could make use of the techniques herein to navigate vehicles that are powered by solar energy (e.g., solely or in combination with other power sources) through areas with greater charging capabilities based on nowcast or forecast irradiance maps and PV power predictions, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    obtaining, by a computing device from an omnidirectional ultra-panoramic camera located at a ground-based mounting location, an image having a view of an entire sky located above the camera and a horizon-to-horizon view of ground and ground-based objects surrounding the camera;
    calibrating, by the computing device, a relationship between locations of pixels of the image and real-world three-dimensional coordinates based on known intrinsic properties of the camera and determined extrinsic position and orientation properties of the camera according to matching the horizon-to-horizon view of ground and ground-based objects surrounding the camera to known ground-based control points and a digital elevation model associated with the ground-based mounting location;
    identifying, by the computing device, pixels within the image that contain clouds;
    georegistering, by the computing device, the clouds to real-world three-dimensional coordinates according to the calibrating;
    estimating, by the computing device, an attenuation level of the clouds;
    generating, by the computing device, a solar irradiance map based on the georegistration of the clouds, a position of the sun, and estimated attenuation level of the clouds, the solar irradiance map indicating an estimation of solar irradiance to reach an area of ground surrounding the camera;
    determining motion of the clouds;
    predicting a future georegistration of the clouds for a given time in the future based on the motion of the clouds; and
    generating a forecast solar irradiance map based on the predicted future georegistration of the clouds, a future position of the sun, and the estimated attenuation level of the clouds, the forecast solar irradiance map indicating a forecast estimation of solar irradiance to reach an area of ground surrounding the camera at the given time in the future.

2. The method as in claim 1, further comprising:
    generating, based on the solar irradiance map, a photovoltaic (PV) power generation prediction for one or more PV panels located within the solar irradiance map.

3. The method as in claim 2, wherein the PV power generation is based on one or more PV panel characteristics selected from a group consisting of: type; model; rating; location; orientation; and direct current (DC) or alternating current (AC) generation.

4. The method as in claim 1, further comprising:
    generating, based on the forecast solar irradiance map, a photovoltaic (PV) power generation prediction at the given time in the future for one or more PV panels located within the solar irradiance map.

5. The method as in claim 1, wherein determining motion of the clouds is based on pattern tracking for cloud feature displacement in sequential images from the camera.

6. The method as in claim 1, wherein predicting the future georegistration of the clouds is based on a simulated advection-diffusion model.

7. The method as in claim 1, wherein determining motion of the clouds comprises:
    determining cloud velocity of the clouds by comparing coincident georegistered cloud patterns from sequential images to determine displacement vectors for the clouds, and then dividing the displacement vectors by a time separation between the sequential images;
    wherein predicting the future georegistration of the clouds is based on applying one or both of fluid dynamics techniques or finite element solvers to the cloud velocity of the clouds.

8. The method as in claim 1, further comprising:
    identifying particular clouds above a given threshold pixel size within the image; and
    tracking the motion of the particular clouds between a plurality of geographically diverse omnidirectional ultra-panoramic cameras.

9. The method as in claim 1, further comprising:
    determining a height of the clouds;
    separating the clouds into a plurality of layers based on the height of the clouds; and
    assigning motion characteristics to each of the plurality of layers, wherein predicting the future georegistration of the clouds is based on the assigned motion characteristics.

10. The method as in claim 1, further comprising:
    coordinating a plurality of overlapping coincident images from a plurality of omnidirectional ultra-panoramic cameras located at geographically dispersed ground-based mounting locations to generate a coordinated solar irradiance map for an area of ground surrounding the plurality of cameras.

11. The method as in claim 1, wherein estimating the attenuation level of the clouds comprises:
classifying the pixels within the image that contain clouds into one of a plurality of transparency categories based on one or both of a brightness of the cloud pixel and a color of the cloud pixel, wherein each of the plurality of transparency categories is associated with a given attenuation level.

12. The method as in claim 1, further comprising:
receiving, from a pyranometer local to the camera, measured solar irradiance data at the pyranometer; and
calibrating the attenuation level of the clouds based on the measured solar irradiance data at the pyranometer.

13. The method as in claim 1, wherein generating the solar irradiance map is further based on a clear sky irradiance model.

14. The method as in claim 1, further comprising:
determining a height of the clouds using a ceilometer, wherein the solar irradiance map is generated further based on the height of the clouds.

15. The method as in claim 1, further comprising:
determining a height of the clouds using infrared-image-based height detection, wherein the solar irradiance map is generated further based on the height of the clouds.

16. The method as in claim 1, further comprising:
determining a height of the clouds using a stereo photogrammetric technique that applies epipolar geometry to overlapping coincident images from a plurality of omnidirectional ultra-panoramic cameras, wherein the solar irradiance map is generated further based on the height of the clouds.

17. The method as in claim 1, further comprising:
removing spatial variations from pixels within the image based on threshold mapping.

18. The method as in claim 1, wherein the omnidirectional ultra-panoramic camera has a 360-degree panoramic view with a horizon-to-horizon field-of-view (FOV) that is greater than 180 degrees.

19. An apparatus, comprising:
an omnidirectional ultra-panoramic camera configured to be located at a ground-based mounting location and to provide images having a view of an entire sky located above the camera and a horizon-to-horizon view of ground and ground-based objects surrounding the camera;
a processor configured to execute one or more processes; and
a memory configured to store a process, the process, when executed by the processor, operable to:
obtain, from the omnidirectional ultra-panoramic camera, an image having a view of an entire sky located above the camera and a horizon-to-horizon view of ground and ground-based objects surrounding the camera;
calibrate a relationship between locations of pixels of the image and real-world three-dimensional coordinates based on known intrinsic properties of the camera and determined extrinsic position and orientation properties of the camera according to matching the horizon-to-horizon view of ground and ground-based objects surrounding the camera to known ground-based control points and a digital elevation model associated with the ground-based mounting location;
identify pixels within the image that contain clouds;
georegister the clouds to real-world three-dimensional coordinates according to the calibrating;
estimate an attenuation level of the clouds;
generate a solar irradiance map based on the georegistration of the clouds, a position of the sun, and estimated attenuation level of the clouds, the solar irradiance map indicating an estimation of solar irradiance to reach an area of ground surrounding the camera;
determine motion of the clouds;
predict a future georegistration of the clouds for a given time in the future based on the motion of the clouds; and
generate a forecast solar irradiance map based on the predicted future georegistration of the clouds, a future position of the sun, and the estimated attenuation level of the clouds, the forecast solar irradiance map indicating a forecast estimation of solar irradiance to reach an area of ground surrounding the camera at the given time in the future.

20. The apparatus as in claim 19, wherein the process, when executed, is further operable to:
generate, based on the solar irradiance map, a photovoltaic (PV) power generation prediction for one or more PV panels located within the solar irradiance map.

21. The apparatus as in claim 19, wherein the process, when executed, is further operable to:
generate, based on the forecast solar irradiance map, a photovoltaic (PV) power generation prediction at the given time in the future for one or more PV panels located within the solar irradiance map.

22. The apparatus as in claim 19, wherein the process, when executed, is further operable to:
coordinate a plurality of overlapping coincident images from a plurality of omnidirectional ultra-panoramic cameras located at geographically dispersed ground-based mounting locations to generate a coordinated solar irradiance map for an area of ground surrounding the plurality of cameras.

23. The apparatus as in claim 19, wherein the process, when executed, is further operable to:
determine a height of the clouds, wherein the solar irradiance map is generated further based on the height of the clouds.

24. The apparatus as in claim 19, wherein the omnidirectional ultra-panoramic camera has a 360-degree panoramic view with a horizon-to-horizon field-of-view (FOV) that is greater than 180 degrees.

25. The apparatus as in claim 19, further comprising:
a pyranometer local to the camera, the pyranometer configured to measure solar irradiance data; and
wherein the process, when executed, is further operable to calibrate the attenuation level of the clouds based on measured solar irradiance data at the pyranometer.

26. A tangible, non-transitory, computer-readable medium storing program instructions that cause a computer to execute a process executable by a processor, the process comprising:
obtaining, from an omnidirectional ultra-panoramic camera located at a ground-based mounting location, an image having a view of an entire sky located above the camera and a horizon-to-horizon view of ground and ground-based objects surrounding the camera;
calibrating a relationship between locations of pixels of the image and real-world three-dimensional coordinates based on known intrinsic properties of the camera and determined extrinsic position and orientation properties of the camera according to matching the horizon-to-horizon view of ground and ground-based objects surrounding the camera to known ground-based control points and a digital elevation model associated with the ground-based mounting location;

identifying pixels within the image that contain clouds;

georegistering the clouds to real-world three-dimensional coordinates according to the calibrating;

estimating an attenuation level of the clouds;

generating a solar irradiance map based on the georegistration of the clouds, a position of the sun, and estimated attenuation level of the clouds, the solar irradiance map indicating an estimation of solar irradiance to reach an area of ground surrounding the camera;

determining motion of the clouds;

predicting a future georegistration of the clouds for a given time in the future based on the motion of the clouds; and generating a forecast solar irradiance map based on the predicted future georegistration of the clouds, a future position of the sun, and the estimated attenuation level of the clouds, the forecast solar irradiance map indicating a forecast estimation of solar irradiance to reach an area of ground surrounding the camera at the given time in the future.

27. The computer-readable medium as in claim 26, wherein the process further comprises:

generating, based on the solar irradiance map, a photovoltaic (PV) power generation prediction for one or more PV panels located within the solar irradiance map.

28. The computer-readable medium as in claim 26, wherein the process further comprises:

generating, based on the forecast solar irradiance map, a photovoltaic (PV) power generation prediction at the given time in the future for one or more PV panels located within the solar irradiance map.

29. The computer-readable medium as in claim 26, wherein the process further comprises:

coordinating a plurality of overlapping coincident images from a plurality of omnidirectional ultra-panoramic cameras located at geographically dispersed ground-based mounting locations to generate a coordinated solar irradiance map for an area of ground surrounding the plurality of cameras.

* * * * *